United States Patent [19]

Kumaki et al.

[11] Patent Number: 5,481,726
[45] Date of Patent: Jan. 2, 1996

[54] INFORMATION PROCESSING SYSTEM HAVING A PLURALITY OF PROCESSORS

[75] Inventors: Satoshi Kumaki; Kazuya Ishihara, both of Hyogo, Japan

[73] Assignee: Mitsubishi Denki Kabushiki Kaisha, Tokyo, Japan

[21] Appl. No.: 112,995

[22] Filed: Aug. 30, 1993

[30] Foreign Application Priority Data

Aug. 28, 1992 [JP] Japan .................. 4-230262

[51] Int. Cl.⁶ .................................................. G06F 13/14
[52] U.S. Cl. ................... 395/200.01; 395/736; 395/729
[58] Field of Search ................................ 395/725, 375, 395/275

[56] References Cited

U.S. PATENT DOCUMENTS

| | | | |
|---|---|---|---|
| 4,268,904 | 5/1981 | Suzuki et al. | 364/DIG. 1 |
| 4,495,569 | 1/1985 | Kagawa | 395/725 |
| 4,788,639 | 11/1988 | Tamaru | 395/725 |
| 5,043,882 | 8/1991 | Ikeno | 395/725 |
| 5,237,686 | 8/1993 | Asano et al. | 395/725 |
| 5,317,747 | 5/1994 | Mochida et al. | 395/725 |
| 5,333,297 | 7/1994 | Lemaire et al. | 395/725 |

FOREIGN PATENT DOCUMENTS 56-96313  8/1981  Japan .

OTHER PUBLICATIONS

"Third Generation TMS320 User's Guide", Texas Instruments, Program Flow Control–Interrupts, 1990 pp. 7-16-7-17.

"High–Speed Processor Bus Arbitration", In: IBM Technical Disclosure Bulletin, vol. 28, No. 12, May 1986, pp. 5329–5333.

*Primary Examiner*—Jack B. Harvey
*Assistant Examiner*—Xuong M. Chung-Trans
*Attorney, Agent, or Firm*—Lowe, Price, LeBlanc & Becker

[57] ABSTRACT

An information processing system including processors, and an interrupt controller responsive to an interrupt request signal from the processors for executing an interrupt process control of processes carried out by the processors. The interrupt controller includes an interrupt process execution device that does not have a multiple interrupt processing function, and an interrupt acceptance device. The interrupt acceptance device has an interrupt reservation signal input terminal, and responds to an interrupt request signal for making determination whether an interrupt is permitted. If interrupt is permitted, an interrupt request generation signal is applied to a corresponding interrupt request generation signal input terminal of the interrupt process execution device. Each of the processors includes an interrupt request signal output circuit and a processing circuit. The interrupt reservation signal output circuit generates and provides to an interrupt reservation signal input terminal of the interrupt acceptance device an interrupt reservation signal prior to an output of an interrupt request signal from the interrupt request signal output circuit. By applying an interrupt reservation signal to the interrupt reservation signal input terminal from the particular processor, an interrupt request signal generated from another processor can not be accepted during the time thereof.

24 Claims, 12 Drawing Sheets

INFORMATION PROCESSING SYSTEM HAVING A PLURALITY OF PROCESSORS

BACKGROUND OF THE INVENTION

1. Field of the Invention

The present invention relates to an information processing system having a plurality of processors and a controller such as a processor having a plurality of interrupt terminals but without a multiple interrupt function, and a controller and a processor used in such an information processing system.

2. Description of the Related Art

FIG. 1 is a block diagram of a control processor of a conventional multiprocessor system which is an example of a system of this type. Referring to FIG. 1, a control processor 20a includes first, second, and third interrupt request signal input terminals 40, 46, and 50 for receiving an interrupt request signal from another processor in the system, first, second, and third interrupt request acceptance signal output terminals 42, 48, and 52 to provide an interrupt request acceptance signal for each processor. Control processor 20a further includes an interrupt processing circuit 22a connected to terminals 40, 42, 46, 48, 50, and 52 for carrying out a predetermined interrupt process in response to the first among input interrupt request signals, a bus 28 connected to interrupt processing circuit 22a and other units (not shown) of processor 20a, and an interface 26 between bus 28 and a system bus 38 of the multiprocessor system.

Interrupt processing circuit 22a includes first, second, and third interrupt request generation signal output circuits 32, 34a, and 36a connected to first, second, and third interrupt signal input terminals 40, 46, and 50, respectively, and a sequence control circuit 30 connected to interrupt request generation signal output circuits 32, 34a, 36a, to first, second and third interrupt request acceptance signal output terminal 42, 48, 52, and to bus 28 for carrying out a predetermined sequence control at the time of interrupt.

Sequence control circuit 30 does not have a multi interrupt function and processes all the input interrupt request generation signals with equal priority. More specifically, sequence control circuit 30 carries out an interrupt process with respect to the first interrupt request generation signal, and does not accept another interrupt request until that interrupt process is completed. If interrupt requests are generated at the same time, only the interrupt request determined according to a predetermined priority level is accepted. Sequence control circuit 30 provides an interrupt request input acceptance signal 70 when any interrupt request generation signal is accepted. Interrupt request input acceptance signal 70 is inverted by an invert circuit (inverter 71) to be applied to first, second and third interrupt request generation signal output circuits 32, 34a, and 36a. When a predetermined interrupt process is completed, sequence control circuit 30 provides an interrupt process end signal 72. Interrupt process end signal 72 is applied to first, second and third interrupt request generation signal output circuits 32, 34a, and 36a.

Each of interrupt request generation signal output circuits 32, 34a, 36a has a similar structure. For example, first interrupt request generation signal output circuit 32 includes a flipflop 54 with an 1 bit set/reset function, and an OR circuit 56. It is assumed that each signal in the signal multiprocessor system complies with a negative logic unless otherwise stated. The set terminal of flipflop 54 is applied with an interrupt request input acceptance signal 70 inverted by invert circuit 71. OR circuit 56 has one input connected to the output of flipflop 54. OR circuit 56 has the other input connected to first interrupt request signal input terminal 40. The output of OR circuit 56 is connected to first interrupt request generation signal input terminal 41 of sequence control circuit 30.

Similarly, second interrupt request generation signal output circuit 34 includes a flipflop 60 and an OR circuit 62. OR circuit 62 has one input connected to second interrupt request signal input terminal 46. The output of OR circuit 62 is connected to second interrupt request generation signal input terminal 47 of sequence control circuit 30.

Third interrupt request generation signal output circuit 36a includes a flipflop 66 and an OR circuit 68. OR circuit 68 has one input connected to third interrupt request signal input terminal 50. The output of OR circuit 68 is connected to third interrupt request generation signal input terminal 51 of sequence control circuit 30.

The conventional control processor 20a shown in FIG. 1 operates as follows. It is assumed that sequence control circuit 30 is not during an interrupt process execution. Each of flipflops 54, 60 and 66 is reset, and each output attains a low level (refer to as "L" level hereinafter). If there is no input of an interrupt request signal from the processors, they attain a high level (referred to as "H" level herein after), and the outputs of OR circuits 56, 62 and 68 attain an H level.

Suppose that an interrupt request signal is entered to first interrupt request signal input terminal 40. More specifically, the signal level of first interrupt request signal input terminal 40 changes to the L level from the H level. The output of OR circuit 56 also attains the L level, whereby an interrupt request generation signal is applied to first interrupt request generation signal input terminal 41.

Sequence control circuit 30 provides an interrupt request input acceptance signal 70 to the respective set terminals of flipflops 54, 60 and 66 when an interrupt request generation signal is accepted. This interrupt request input acceptance signal 70 changing from the H level to the L level is inverted by invert circuit 71. Flipflops 54, 60 and 66 are set at the rising edge thereof. The outputs of flipflops 54, 60 and 66 attain the H level. As a result, the outputs of OR circuits 56, 62 and 68 all attain the H level regardless of the value of the input interrupt request signal. In other words, an interrupt request signal will be no longer accepted.

When an interrupt request signal is accepted, sequence control circuit 30 initiates the execution of a predetermined interrupt process. Sequence control circuit 30 provides an interrupt process end signal 72 when the execution of this interrupt process is completed. Interrupt process end signal 72 is a pulse of negative logic having a predetermined pulse width. Flipflops 54, 60 and 66 are reset at the rising edge of interrupt process end signal 72. The signal applied to one input of each of OR circuits 56, 62 and 68 from flipflops 54, 60, and 66, respectively, attains the L level. If an interrupt request signal is entered to each of interrupt request signal input terminals 40, 46 and 50, that signal will be provided to sequence control circuit 30.

When sequence control circuit 30 accepts an interrupt request signal from first interrupt request signal input terminal 40 as described above, an interrupt request acceptance signal is simultaneously provided to the relevant processor via terminal 42. The processor generating the interrupt request signal initiates a predetermined process in response to this interrupt request acceptance signal.

When flipflops 54, 60 and 66 are set by an interrupt request input acceptance signal 70, the output of each of OR circuits 56, 62 and 68 attains the H level regardless of the presence of an interrupt request signal. Therefore, a signal indicating generation of an interrupt request is not applied to sequence control circuit 30 even if an interrupt request signal is input. The initiated interrupt process can be executed until the end thereof. When the interrupt processing is completed, flipflops 54, 60 and 66 are reset by an interrupt process end signal 72. As a result, acceptance of another interrupt request signal is allowed.

FIG. 2 is a block diagram of a DCT processor 92a for carrying out a predetermined process, for example a DCT (Discrete Cosine Transform) process used in a multiprocessor system including the control processor shown in FIG. 1. Referring to FIG. 2, DCT processor 92a includes an interrupt request signal output terminal 98 connected to first interrupt request signal input terminal 40 and first interrupt request acceptance signal output terminal 42 (refer to FIG. 1), and an interrupt request acceptance signal input terminal 100. Terminals 98 and 100 are both connected to a processor 120. DCT processor 92a further includes a local memory 126, and a bus 122 connecting local memory 126 and processor 120. Bus 122 is connected to system bus 38 by an interface 124.

DCT processor 92a operates as follows. DCT processor 92a functions to process image data including a great amount of data for every 1 block (for example, 1 block is 8 lines×8 pixels). The image data is already stored in a main memory not shown in the system. Prior to the process of 1 block of image data, DCT processor 92a must read out 1 block of image data from the system main memory to write the same into local memory 126. Similarly, data after the process must be read out from local memory 126 to be written into the main memory of the system.

In such cases, contention of access from each processor occurs with respect to the system memory shared in the system. To solve such contention, a processor including DCT processor 92 carries out an operation set forth in the following.

When image data is to be read out from the system memory, processor 120 provides an interrupt request signal from terminal 98. This interrupt request signal is applied, for example, to first interrupt request signal input terminal 40 of control processor 20a shown in FIG. as described above.

If sequence control circuit 30 of FIG. 1 attains a state that allows interrupt, this interrupt request signal is accepted, and an interrupt request acceptance signal is returned to interrupt request acceptance signal input terminal 100. In response, processor 120 initiates a process of data transfer from the main memory.

Data read out from the main memory and data writing into local memory 126 are carried out as follows. Referring to FIG. 1, if an interrupt request from DCT processor 92a is accepted, sequence control circuit 30 invokes an interrupt process to read out data of a predetermined block from the main memory not shown. The read out data is applied to interface 124 of FIG. 2 via system bus 38. Processor 120 writes the data provided via interface 124 into local memory 126. When this reading and writing of 1 block of data is completed, the interrupt process of sequence control circuit 30 ends. An interrupt request signal applied to control processor 20a is not accepted during execution of the interrupt process. The other processors attain a standby state until their interrupt requests are accepted.

When 1 block of image data is written into local memory 126, DCT processor 92a carries out a predetermined DCT process on each data. When the predetermined process on all the 1 block of data is completed, processor 120 provides an interrupt request signal to processor 20a via interrupt request signal output terminal 98. If this interrupt request signal is accepted, data is read out from local memory 126 to be provided to interface 124. Control processor 20a initiates an interrupt process, whereby data is read out to system bus 38 via interface 124 to be written into the system memory. Reading out data from local memory 126 and writing the data into the main memory are carried out as interrupt processes. If a process to a subsequent block is to be carried out in succession, data of the next block is read out from the main memory to be written into local memory 126 succeeding the interrupt process. During this interrupt process, input of an interrupt request signal to control processor 20a is not accepted.

When there is a possibility of access contention or the like with respect to the resource shared by the system, such contention was solved by control processor 20a.

FIG. 3 schematically shows an operation of a conventional multiprocessor system. In this system, first to third processes are to be carried out by three processors.

Referring to FIG. 3, it is assumed that a first interrupt request is generated at time t1, and the first interrupt request is accepted at time t2. Execution of the first interrupt process is initiated at time t2. This first interrupt process ends at time t3. At time t4, a second interrupt request signal is entered. At time t5, this second interrupt request signal is accepted, whereby the second interrupt process is initiated.

It is assumed that a third interrupt request is generated at time t6, and the first interrupt request is generated again at time t7 during the initiation and completion of the second interrupt process (time t5-time t8). Because flipflops 54 and 66 are set when the second interrupt request is accepted as described above, the third interrupt request and the first interrupt request are not accepted at system control circuit 30 and forced to wait until the second interrupt process is completed.

When the second interrupt process ends, the third interrupt request is accepted at time t9, whereby execution of the third interrupt process is initiated. The first interrupt request process is not accepted, resulting in a standby state during execution of the third interrupt process. When the third interrupt process ends at time t10, the first interrupt is accepted at time t11. Then, execution of the first interrupt process is initiated, and ends at time t12.

Each processor generates an interrupt request to the control processor when access to a common resource is requested. Each processor causes a predetermined interrupt process to be initiated by the control processor while carrying out access to the common resource. When the common resource is accessed and data required for processing is applied to each processor, each processor carries out processing independent of the control processor and other processors. When the process is completed and access to the common resource is required again, an interrupt request signal is provided to carry out access to the common resource under the control of the control processor.

When an interrupt request signal is input from different interrupt request input terminals simultaneously, the interrupt process is accepted according to predetermined priority levels.

Thus, in an information processing system having a plurality of processors, an interrupt request from a processor is not accepted once an interrupt process of another processor is initiated. There is difference in the amounts of load of the processes carried out by the processors. The processing execution of a processor of heavy load is time consuming to increase the processing time period of the entire system. Therefore, acceptance of such an interrupt process should be carried out prior to other processors. However, the above-described information processing system lacking a multiple interrupt function simply carries out acceptance according to the order of interrupt request generation even if it is apparent that a certain processor should be served first. Because the process to be carried out by a processor of the greatest load is not carried out satisfactorily, the process in other processors using the data result thereof is often made to standby. Therefore, the operation of the entire system was not efficient. This problem can generally be solved by using a controller having a multiple interrupt function. However, the hardware of such a controller is complicated and expensive. There was also a problem that the process required in the controller will become complicated.

SUMMARY OF THE INVENTION

In view of the foregoing, an object of the present invention is to provide an information processing system having a plurality of processors that can improve the operation efficiency of the system without unduly complicating the hardware and the process carried out therein.

Another object of the present invention is to provide a controller that can improve the operation efficiency of an entire information processing system including a plurality of processors without unduly complicating the hardware and the process carried out therein.

A further object of the present invention is to provide a processor that can improve the entire operation efficiency of an information processing system including a controller and a plurality of processors without unduly complicating the hardware and the process carried out therein.

A still further object of the present invention is to provide an information processing system of high usability including an information processing device having a plurality of processors that can operate more effectively without unduly complicating the hardware and the process carried out therein.

An information processing system according to the present invention includes a plurality of information processors each capable of individual process; and an interrupt controller responsive to an interrupt request signal provided from the plurality of information processors for carrying out an interrupt process to control execution of the process of the plurality of information processors.

The interrupt controller includes an interrupt process execution device without a multiple interrupt process function, and an interrupt acceptance device.

The interrupt process execution device includes a plurality of interrupt request generation signal input terminals to which an interrupt request generation signal is applied, a plurality of interrupt request acceptance signal output terminals provided corresponding to the plurality of interrupt request generation signal input terminals, an interrupt request input acceptance signal output terminal, and an interrupt process end signal output terminal. The interrupt process execution device responds to the first interrupt request generation signal among those applied to the plurality of interrupt request generation signal input terminals to provide the interrupt acceptance signal to a corresponding interrupt request acceptance signal output terminal and an interrupt request input acceptance signal to an interrupt request input acceptance signal output terminal for initiating execution of a predetermined interrupt process. When the predetermined interrupt process is completed, the interrupt process execution device provides an interrupt process end signal to the interrupt process end signal output terminal.

The interrupt acceptance device includes a plurality of interrupt request signal input terminals for receiving an externally applied interrupt request signal, each provided corresponding to a different one of the plurality of interrupt request generation signal input terminals. The plurality of interrupt request signal input terminals include a first interrupt request signal input terminal. The interrupt acceptance device further includes an interrupt reservation signal input terminal to receive an externally applied interrupt reservation signal. The interrupt acceptance device responds to an interrupt request signal applied to an interrupt request signal input terminal to make determination whether an interrupt is permitted or not according to a predetermined condition on the basis of an interrupt acceptance signal, an interrupt process end signal, and an interrupt reservation signal. If permitted, an interrupt request generation signal is provided to be applied to a corresponding interrupt request generation signal input terminal of the interrupt process execution device.

Each of the plurality of information processors includes an interrupt request signal output circuit and a processing circuit. The interrupt request signal output circuit generates an interrupt request signal when a predetermined condition is met and provides the same to a corresponding interrupt request signal input terminal of the interrupt controller. The processing circuit is connected to a corresponding interrupt request acceptance signal output terminal. The processing circuit executes a predetermined process in response to an interrupt request acceptance signal provided from the interrupt controller in response to its own interrupt request signal.

The information processor connected to the first interrupt request signal input terminal further includes an interrupt reservation signal output circuit. The interrupt reservation signal output circuit provides an interrupt reservation signal which is applied to the interrupt reservation signal input terminal of the interrupt acceptance device prior to an output of an interrupt request signal from the interrupt request signal output circuit.

Because the information processor device connected to the first interrupt request signal input terminal applies an interrupt reservation signal to the interrupt reservation signal input terminal prior to generation of an interrupt request signal, an interrupt request signal generated from another information processing device will not be accepted. As a result, an interrupt request from the information processor connected to the first interrupt request signal input terminal can be accepted with priority using a relatively simple interrupt process execution device without a multiple interrupt function. Because a task with higher priority can be assigned to the information processor connected to the first interrupt request signal input terminal, the operation efficiency of the information processing system can be improved.

According to a preferred embodiment of the present invention, a plurality of interrupt request signal input terminals include a single first interrupt request signal input terminal, and a second interrupt request signal input terminal. The interrupt acceptance device includes a first interrupt request generation signal output circuit and a second interrupt request signal output circuit. The first interrupt request generation signal output circuit is provided corresponding to the first interrupt request signal input terminal, and makes determination whether the interrupt process execution device can accept an interrupt according to an interrupt acceptance signal and interrupt process end signal in response to an interrupt request signal applied to the first interrupt request signal input terminal. If possible, an interrupt request generation signal is output to be applied to a corresponding interrupt request generation signal input terminal of the interrupt process execution device. The second interrupt request generation signal output circuit is provided corresponding to the second interrupt request signal input terminal, and responds to an interrupt request signal applied to the second interrupt request signal input terminal for making determination whether an interrupt is permitted according to an interrupt acceptance signal, an interrupt process end signal, and an interrupt reservation signal. If interrupt is permitted, an interrupt request generation signal is output to be provided to a corresponding interrupt request generation signal input terminal of the interrupt process execution device.

The determination operation in the first interrupt request signal output circuit is independent of an interrupt reservation signal. The presence of an interrupt reservation signal only has effect on the determination in the second interrupt request output circuit. As a result, the interrupt request applied to the first interrupt request signal input terminal can be accepted with priority. The level of the hardware complexity will not be increased. Because a task with higher priority can be assigned to the information processor connected to the first interrupt request signal input terminal, the operation efficiency of the information processing system can be improved.

According to another aspect of the present invention, an information processor is connected to an interrupt controller including a plurality of interrupt request signal input terminals, a plurality of interrupt request acceptance signal output terminals provided corresponding to the interrupt request signal input terminals, and an interrupt reservation signal. The information processor includes an interrupt request signal output circuit, a processing circuit, and an interrupt reservation signal output circuit. The interrupt request signal output circuit generates and provides to the first interrupt request signal input terminal of the interrupt controller an interrupt request signal when a predetermined condition is met. The processing circuit is connected to an interrupt request acceptance signal output terminal corresponding to the first interrupt request signal input terminal to execute a predetermined process in response to an interrupt request acceptance signal provided from the interrupt controller. The interrupt reservation signal output circuit outputs and provides to the interrupt reservation signal input terminal of the interrupt controller an interrupt reservation signal prior to an output of an interrupt request signal from the interrupt request signal output signal.

Because the information processor applies an interrupt reservation signal to the interrupt reservation signal input terminal prior to generation of an interrupt request signal, any interrupt request signal generated from other processors will not be accepted during that time period. As a result, using a relatively simple interrupt process execution device without a multiple interrupt function, the interrupt request from the processor can be accepted with priority. Thus, the operation efficiency of the information processing system can be improved.

According to a preferred embodiment of the present invention, the interrupt reservation signal output circuit provides an interrupt reservation signal when a predetermined time period starting from the provision of an interrupt request acceptance signal elapses.

According to this embodiment, an interrupt reservation signal can be generated with a simple circuit by assigning to the information processing system a task in which it is possible to estimate in advance the time period starting from generation of an interrupt to the generation of the next interrupt.

According to another aspect of the present invention, an information processing system having a plurality of information processors each capable of execution of individual process, includes an interrupt controller responsive to an interrupt request signal provided by the plurality of information processors for controlling execution of a process carried out by the plurality of information processors, wherein the interrupt controller includes an interrupt process execution circuit without a multiple interrupt process function, and an interrupt acceptance circuit.

The interrupt process execution circuit includes a plurality of interrupt request generation signal input terminals, a plurality of interrupt request acceptance signal output terminals provided corresponding to the plurality of interrupt generation signal input terminals, an interrupt request input acceptance signal output terminal, and an interrupt process end signal output terminal. An interrupt request generation signal is applied to the plurality of interrupt request generation signal input terminals. The interrupt execution circuit responds to the first interrupt request generation signal among those applied to the plurality of interrupt request generation signal input terminals to provide an interrupt acceptance signal to a corresponding interrupt request acceptance signal output terminal and an interrupt request input acceptance signal to an interrupt request input acceptance signal output terminal for initiating the execution of a predetermined interrupt process. The interrupt process execution circuit completes the predetermined interrupt process and provides an interrupt process end signal to the interrupt process end signal output terminal.

The interrupt acceptance circuit includes a plurality of interrupt request signal input terminals and an interrupt reservation signal input terminal. The plurality of interrupt request signal input terminals include a first interrupt request signal input terminal. Each of the plurality of interrupt request signal input terminals corresponds to a different one of the plurality of interrupt request generation signal input terminals to receive an interrupt request signal from a corresponding information processor. The interrupt reservation signal input terminal is connected to one of the plurality of information processors from which an interrupt reservation signal is provided. The interrupt acceptance signal responds to an interrupt request signal provided to the interrupt request signal input terminal to make determination whether interrupt is permitted or not according to a predetermined condition on the basis of an interrupt acceptance signal, an interrupt process end signal, and an interrupt reservation signal. If interrupt is permitted, the interrupt acceptance device outputs an interrupt request generation signal which is applied to a corresponding interrupt request generation signal input terminal of the interrupt process execution circuit.

Because the information processor connected to the first interrupt request signal input terminal applies an interrupt reservation signal to the interrupt reservation signal input terminal prior to generation of an interrupt request signal, an interrupt request signal generated from another information processor will not be accepted during that time period. As a result, the interrupt request from the information processor connected to the first interrupt request signal input terminal is accepted with priority using a relatively simple interrupt process execution device without a multiple interrupt function. Because a task with higher priority can be assigned to the information processor connected to the first interrupt request signal input terminal, the operation efficiency of the information processing system can be improved.

According to a further aspect of the present invention, a plurality of interrupt request signal input terminals of the interrupt controller includes a single first interrupt request signal input terminal, and a second interrupt request signal input terminal. The interrupt acceptance circuit includes a first interrupt request generation signal output circuit and a second interrupt request generation signal output circuit. The first interrupt request generation signal output circuit is provided corresponding to the first interrupt request signal input terminal, and responds to an interrupt request signal applied to the first interrupt request signal input terminal for making determination whether the interrupt process execution device can accept an interrupt according to an interrupt acceptance signal and an interrupt process end signal. If an interrupt is possible, the interrupt request generation signal output circuit provides an interrupt request generation signal which is applied to a corresponding interrupt request generation signal input terminal of the interrupt process execution device. The second interrupt request generation signal output circuit is provided corresponding to the second interrupt request signal input terminal, and responds to an interrupt request signal applied to the second interrupt request signal input terminal for making determination whether an interrupt is permitted or not according to an interrupt acceptance signal, an interrupt process end signal, and an interrupt reservation signal. If an interrupt is permitted, the second interrupt request generation signal output circuit provides an interrupt request generation signal which is applied to a corresponding interrupt request generation signal input terminal of the interrupt process execution circuit.

The interrupt reservation signal does not affect the determination in the first interrupt request signal output circuit. The presence of an interrupt reservation signal is related only to the determination in the second interrupt request signal output circuit. As a result, the interrupt request applied to the first interrupt request signal input terminal can be accepted with priority. The amount of the hardware will not be increased. A task with higher priority can be assigned to the information processor connected to the first interrupt request signal input terminal to improve the operation efficiency of the information processing system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An information processing system including a plurality of processors according to an embodiment of the present invention will be described hereinafter taking a multiprocessor system for coding image data as an example. The present invention is not limited to such a multiprocessor system, and is applicable to any information processing system including processors each capable of executing a predetermined process individually with higher priority for particular processor. Such an information processing system is not limited to application for coding image data, and is applicable to any system for executing a process that can be divided into processes by a plurality of processors.

The process flow of coding image data will first be described with reference to FIG. 4. Each image process is carried out to a unit of a predetermined block of image data, for example, a block of 8 lines×8 pixels, as mentioned above.

Figure 4:
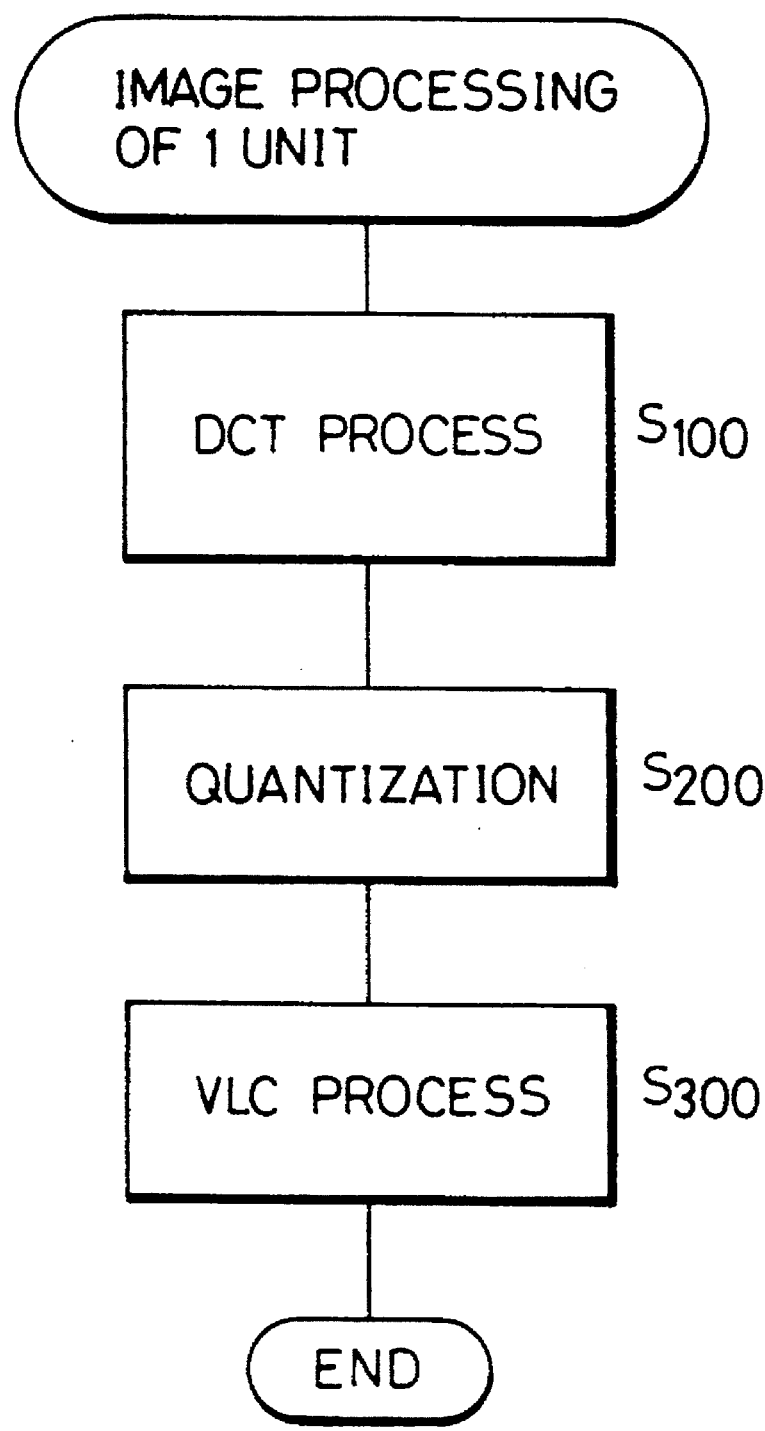
FIG. 4 is a flow chart of image processing according to an application of the present invention.

Referring to FIG. 4, a coding process of each unit of image data includes a DCT process (S100), a quantization process (S200), and a VLC (Variable Length Coding) process (S300). The processes are carried out in the order of a DCT process, a quantization process, and a VLC process for each 1 block of image data. This means that a quantization process of a certain block cannot be carried out unless the DCT process of that program is completed. Similarly, a VLC process cannot be carried out if the quantization process for that block is not completed. However, if the DCT process of a certain block is completed, the quantization process for that block and a DCT process for the next block can be carried out independent of each other. The same can be said for a VLC process and a quantization process. Therefore, if the system is implemented so that a DCT process, a quantization process, and a VLC process are carried out by individual processors and data transfer is carried out using a common buffer, the efficiency of the system can be improved. The multiprocessor system set forth in the following is provided to carry out such image processing.

It is to be noted in FIG. 4 that there is significant difference in the amount of calculation carried out in each process. In a DCT process, a great amount of sum-of-product calculation is carried out, resulting in heavy load. The calculation carried out in the quantization process is mainly of multiplication, which is actually an addition process. Therefore, the load thereof is low in comparison with that of the DCT process. The VLC process provides a variable code according to the data pattern and is substantially equal to a table look up process. Therefore, the load of a VLC process is low in comparison with the load of a DCT process.

Suppose that a DCT process, a quantization process, and a VLC process are executed with equal priority in the coding process of image data in the process shown in FIG. 4. There is a possibility of the interrupt process of a DCT process put in a waiting state due to another interrupt process of a quantization process or a VLC process, resulting in delay of execution of a DCT process. Such a delay will also cause delay in the subsequent execution of a quantization process and a VLC process. Thus, the process efficiency of the entire system can be degraded. In the multiprocessor system of the present embodiment, the DCT process is to be executed given priority higher than the other two process.

Figure 5:
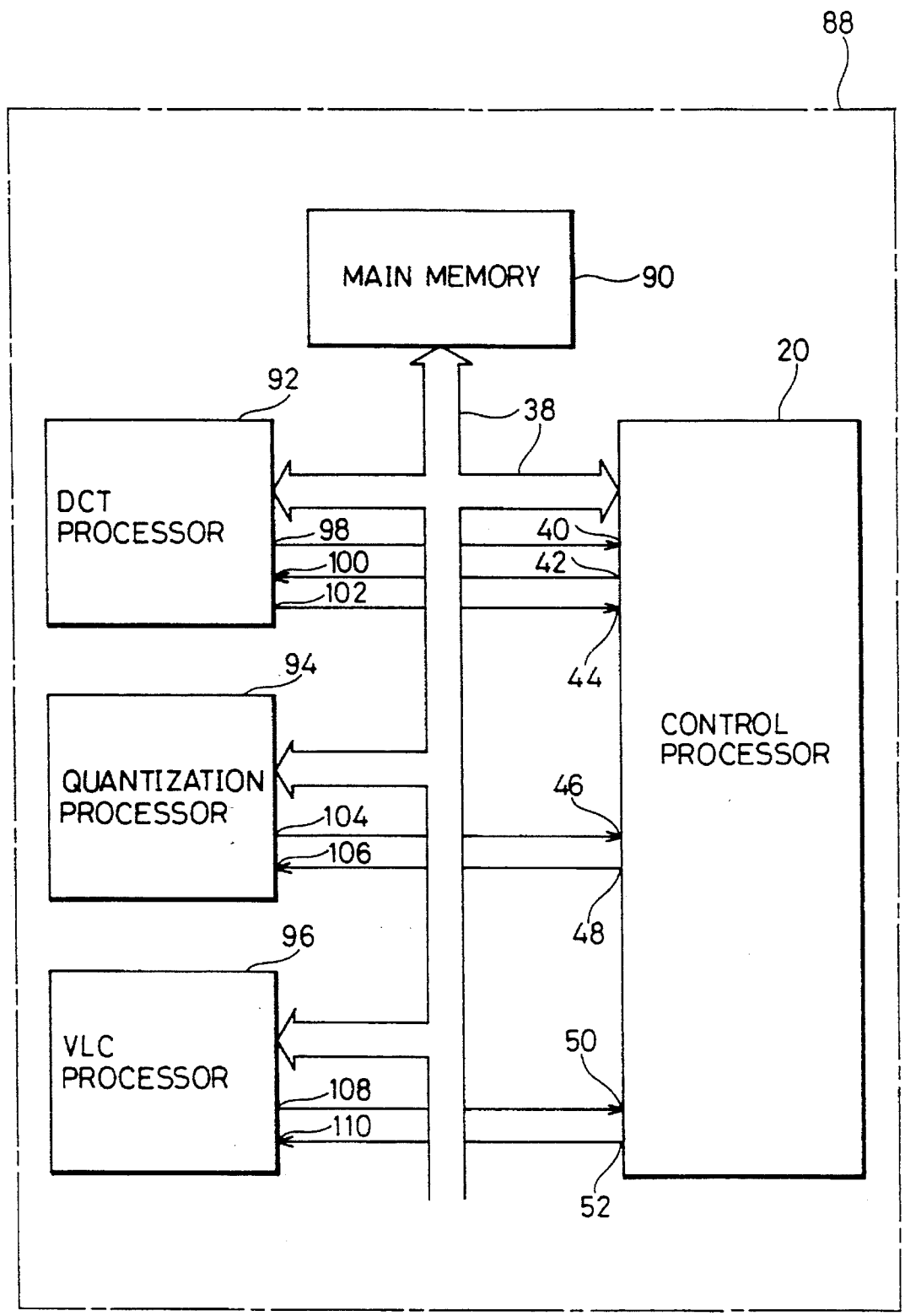
FIG. 5 shows a multiprocessor system according to an embodiment of the present invention in a block format.

FIG. 5 is a block diagram of the multiprocessor system. This multiprocessor system is formed on a single substrate 88. Referring to FIG. 5, the multiprocessor system includes a control processor 20, a system bus 38 connected to control processor 20, a DCT processor 92, a quantization processor 94, and a VLC processor 96 respectively connected to system bus 38, and a main memory 90 connected to system bus 38 and used as a data buffer for each of processors 92, 94 and 96.

Control processor 20 includes first, second and third interrupt request signal input terminals 40, 46 and 50, first, second and third interrupt request acceptance signal output terminals 42, 48 and 52, and an interrupt reservation signal input terminal 44 for receiving an externally applied interrupt reservation signal.

DCT processor 92 includes an interrupt request signal output terminal 98 connected to first interrupt request signal input terminal 40, an interrupt request acceptance signal input terminal 100 connected to first interrupt request acceptance signal output terminal 42, and an interrupt reservation signal output terminal 102 connected to interrupt reservation signal input terminal 44.

Quantization processor 94 includes an interrupt request signal output terminal 104 connected to second interrupt request signal input terminal 46, and an interrupt request acceptance signal input terminal 106 connected to second interrupt request acceptance signal output terminal 48.

VLC processor 96 includes an interrupt request signal output terminal 108 connected to third interrupt request signal input terminal 50, and an interrupt request acceptance signal input terminal 110 connected to third interrupt request acceptance signal output terminal 52.

Figure 6:
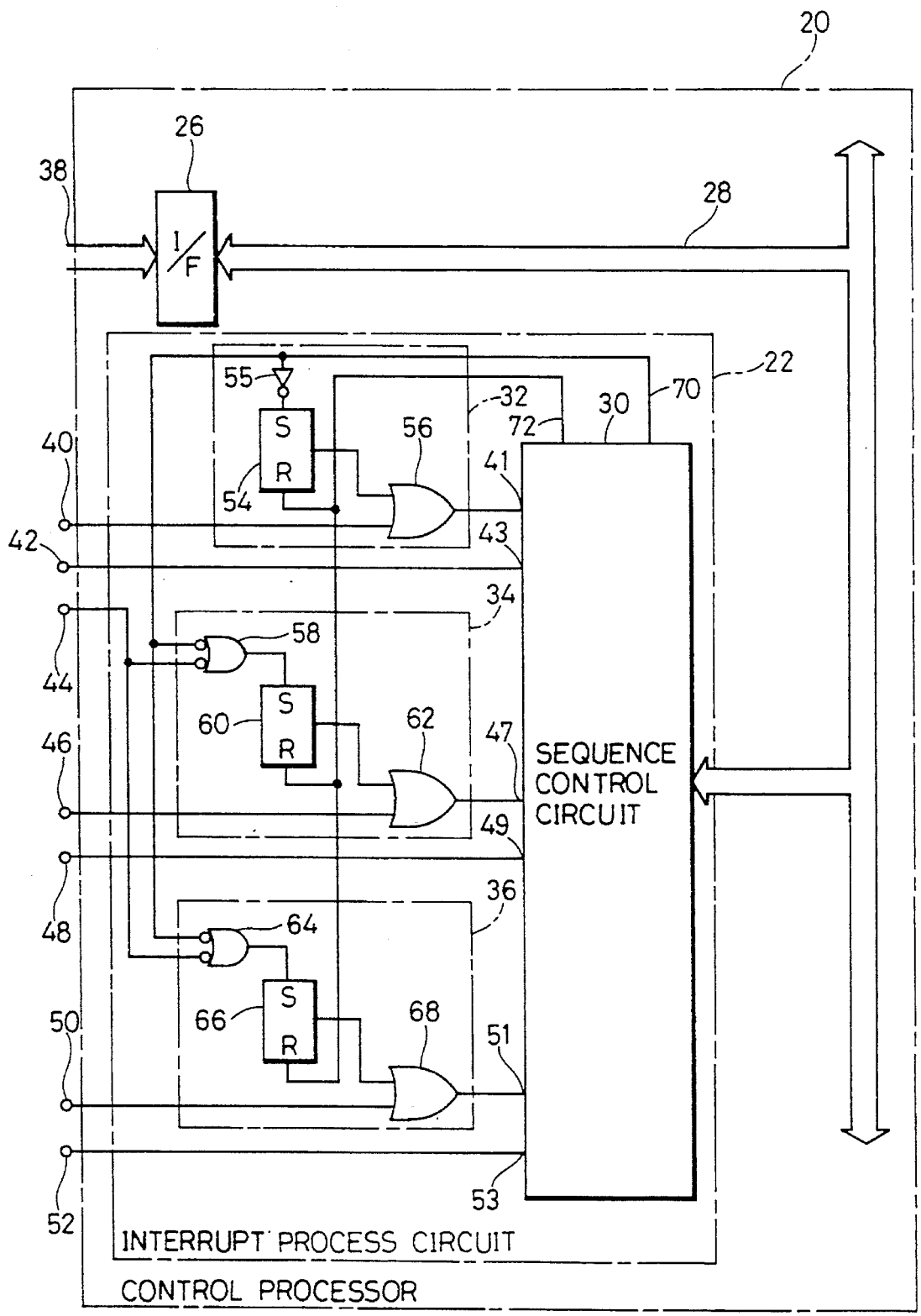
FIG. 6 shows a control processor of a multiprocessor system according to an embodiment of the present invention in a block format.

FIG. 6 is a block diagram of control processor 20. Referring to FIG. 6, control processor 20 includes an interrupt processing circuit 22 connected to terminals 40, 42, 44, 46, 48, 50 and 52, a bus 28 connected to interrupt processing circuit 20, and an interface 26 between system bus 38 and bus 28.

Interrupt processing circuit 22 includes first, second and third interrupt request generation signal output circuits 32, 34, and 36 connected to first, second and third interrupt request signal input terminals 40, 46 and 50, respectively, and a sequence control circuit 30 connected to the outputs of first, second and third interrupt request generation signal output circuits 32, 34, and 36, and to first, second and third interrupt request acceptance signal output terminals 42, 48 and 52, and responsive to an input interrupt request generation signal for executing a predetermined interrupt process.

Second and third interrupt request generation signal output circuits 34 and 36 are both connected to interrupt reservation signal input terminal 44.

Sequence control circuit 30 includes first, second and third interrupt request signal generation signal input terminals 41, 47, and 51 which are connected to the outputs of first, second and third interrupt request generation signal output circuit 32, 34 and 36, respectively. Sequence control circuit 30 further includes first, second and third interrupt request acceptance signal output terminals 43, 49 and 53 which are connected to first, second and third interrupt request acceptance signal output terminals 42, 48, and 52, respectively. Sequence control circuit 30 further provides an interrupt request input acceptance signal 70 and an interrupt process end signal 72. Interrupt request input acceptance signal 70 and interrupt process end signal 72 are both applied to first, second and third interrupt request generation signal output circuits 32, 34 and 36.

First interrupt request generation signal output circuit 32 further includes an invert circuit (inverter) 55, a flipflop 54 with a one bit set/reset function, and an OR circuit 56. The set terminal of flipflop 54 is supplied with an interrupt request input acceptance signal 70 from sequence control circuit 30 which is inverted by invert circuit 55. The reset terminal of flipflop 54 is supplied with an interrupt process end signal 72 from sequence control circuit 30. OR circuit 56 has one input connected to the output of flipflop 54 and the other input to first interrupt request signal input terminal 40. The output of OR circuit 56 is connected to first interrupt request generation signal input terminal 41 of sequence control circuit 30.

Second and third interrupt request generation signal output circuits 34 and 36 have the same structure. For example, second interrupt request generation signal output circuit 34 includes a NAND circuit 58, a flipflop 60 with a 1 bit set/reset function, and an OR circuit 62. Interrupt request input acceptance signal 70 from sequence control circuit 30 is applied to one input of NAND circuit 58. The other input of NAND circuit 58 is applied with an interrupt reservation signal from interrupt reservation signal input terminal 44. The output of NAND circuit 58 is connected to the set terminal of flipflop 60. The reset terminal of flipflop 60 is applied with an interrupt process end signal 72 from sequence control circuit 30. OR circuit 62 has one input connected to the output of flipflop 60, and the other input to second interrupt request signal input terminal 46. The output of OR circuit 62 is connected to second interrupt request generation signal input terminal 47 of sequence of control circuit 30.

Similarly, third interrupt request generation signal output circuit 36 includes a NAND circuit 64, a flipflop 66, and an OR circuit 68. NAND circuit 64 has one input applied with an interrupt request input acceptance signal 70 from sequence control circuit 30, and the other input applied with an interrupt reservation signal from interrupt reservation signal input terminal 44. The output of NAND circuit 64 is connected to the set terminal of flipflop 66. The reset terminal of flipflop 66 is applied with an interrupt process end signal 72 from sequence control circuit 30. OR circuit 68 has one input connected to the output of flipflop 66 and the other input to third interrupt request signal input terminal 50. The output of OR circuit 68 is connected to third interrupt request generation signal input terminal 51 of sequence control circuit 30.

Figure 7:
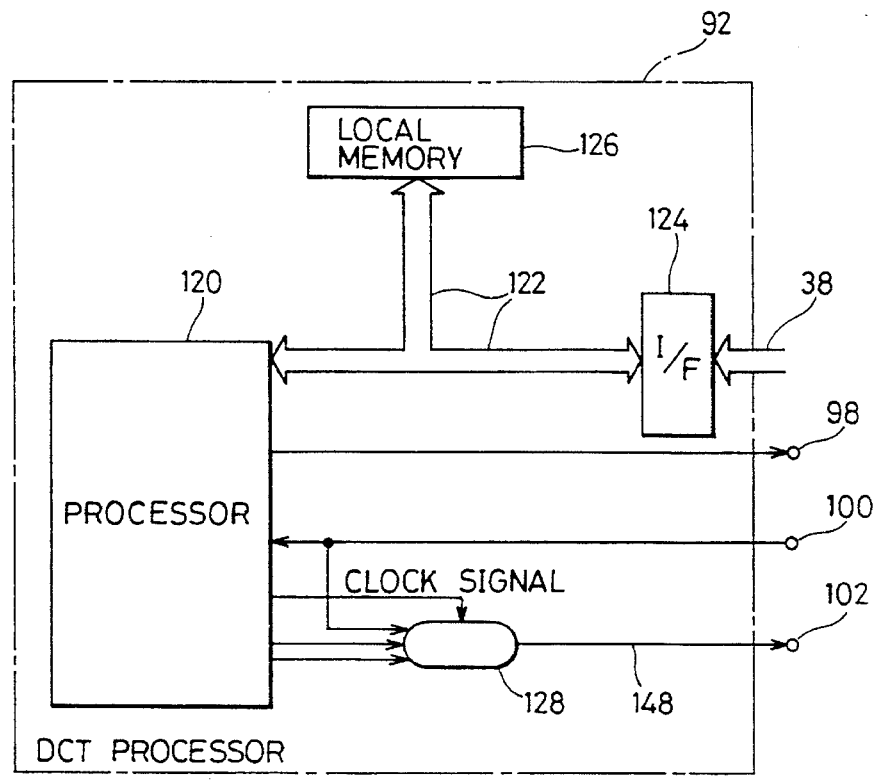
FIG. 7 is a block diagram of a DCT processor according to an embodiment of a processor of the present invention.

The control processor 20 operates as follows:

FIG. 7 is a block diagram of DCT processor 92. Referring to FIG. 7, DCT processor 92 includes a local bus 122 connected to system bus 38 via an interface 124, and a local memory 126 and a processor 120 both connected to local bus 122. Processor 120 is connected to interrupt request signal output terminal 98 and interrupt request acceptance signal input terminal 100. DCT processor 92 further includes an interrupt reservation signal generation circuit 128 responsive to an interrupt request acceptance signal provided from interrupt request acceptance signal input terminal 100 to generate a signal delayed by a predetermined time period from an interrupt request acceptance signal to provide the same as an interrupt reservation signal 148 to an interrupt reservation signal output terminal 102.

Local memory 126 serves to store 1 block of image data to be processed by DCT processor 92.

Figure 8:
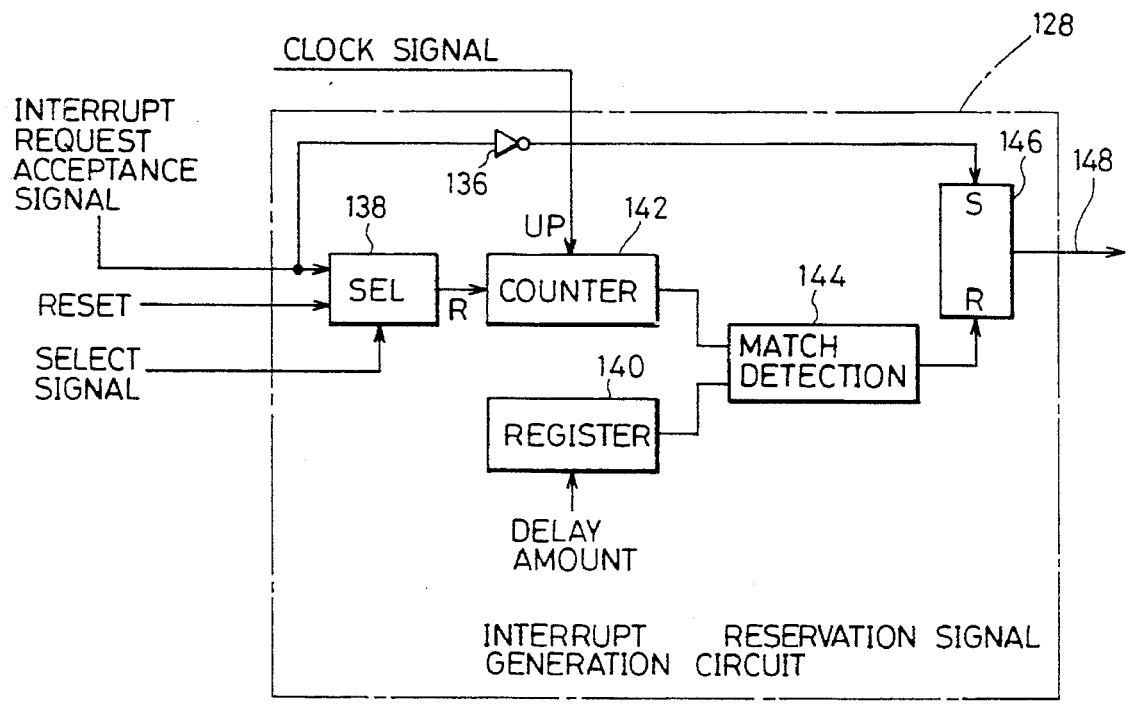
FIG. 8 is a block diagram of an interrupt reservation signal generation circuit.

Referring to FIG. 8, interrupt reservation signal generation circuit 128 receives a clock signal, a reset signal, and a select signal from processor 120 in addition to the interrupt request acceptance signal provided from interrupt request acceptance signal input terminal 100. These signals will be described afterwards. Interrupt reservation signal generation circuit 128 functions to delay an interrupt request acceptance signal input for a predetermined time period to provide the same as an interrupt reservation signal 148.

Interrupt reservation signal generation circuit 128 includes a selector 138, a counter 142, a register 140, a match detection circuit 144, an invert circuit 136, and a flipflop 146 with a 1 bit set/reset function. Selector 138 has one input supplied with an interrupt request acceptance signal, and the other input with a reset signal from processor 120. In response to a select signal from processor 120, selector 138 selects and provides to counters 142 one of the two inputs. The reset terminal of counter 142 is connected to the output of selector 138. A clock signal is applied as an input to counter 142. Register 140 has a delay amount set in advance corresponding to a predetermined delay time period. This value can be changed. Match detection circuit 144 has one input connected to the output of counter 142 and the other input connected to the output of register 140. The set terminal of flipflop 146 is connected to the output of invert circuit 136. The reset terminal of flipflop 146 is connected to the output of match detection circuit 144. The output terminal of flipflop 146 is connected to an interrupt reservation signal output terminal 102 shown in FIG. 7.

Figure 1:
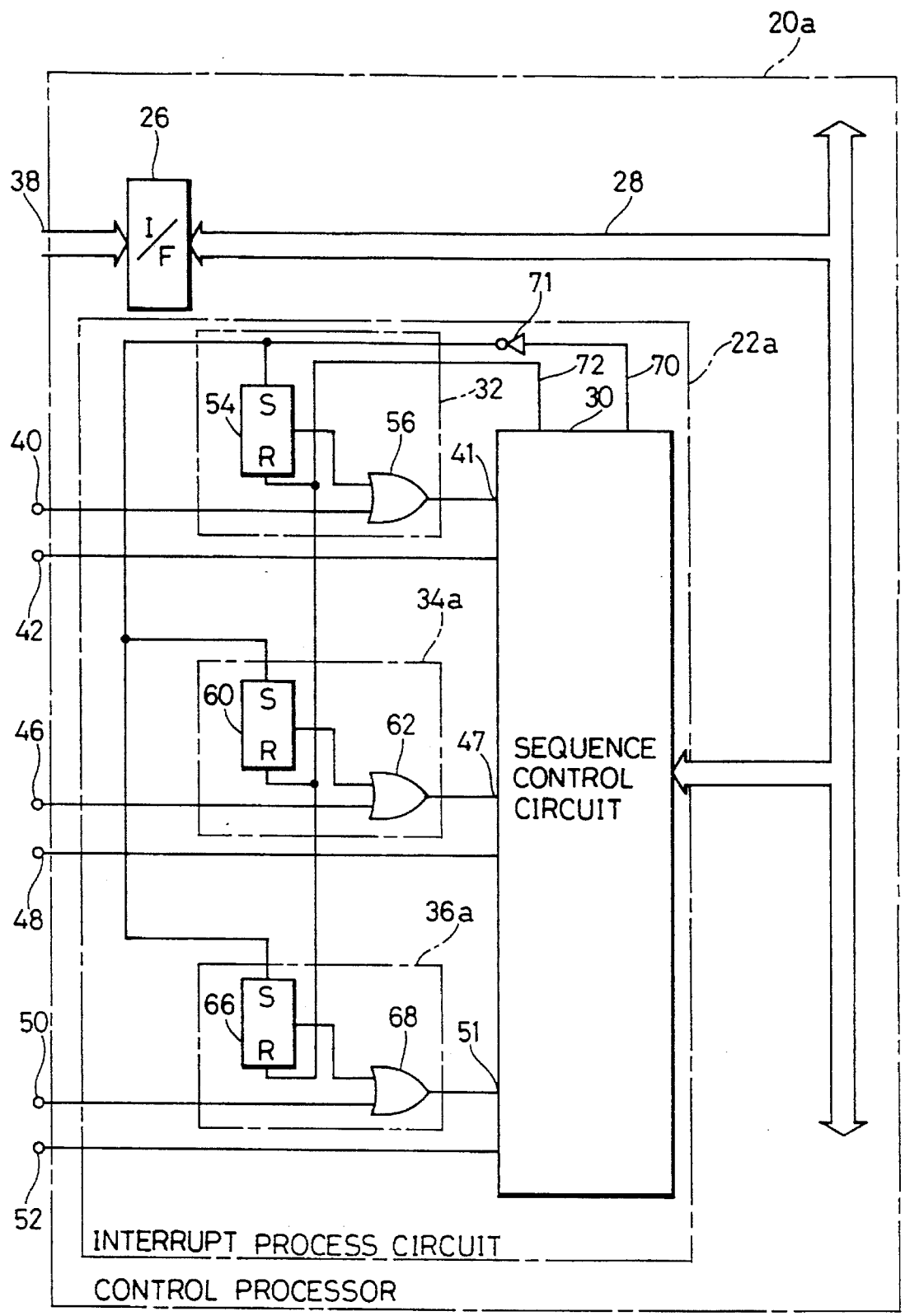
FIG. 1 is a block diagram of a control processor of a conventional multiprocessor system.
Figure 2:
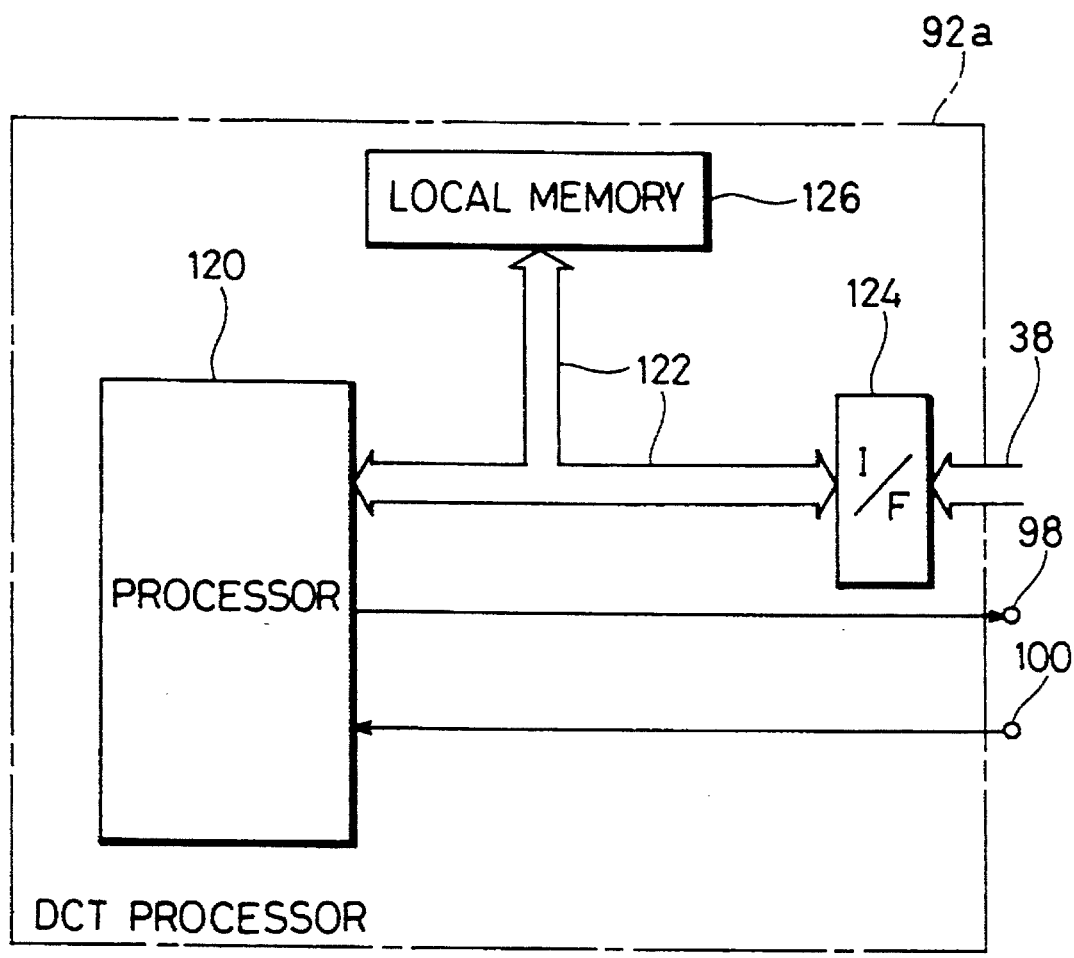
FIG. 2 is a block diagram of a DCT processor according to an example of a conventional processor.

Referring to FIG. 5 again, quantization processor 94 and VLC processor 96 have a structure identical to that of the conventional device of DCT processor 92a shown in FIG. 2. Therefore, the description thereof will not be repeated here.

Referring to FIGS. 5–8, a multiprocessor system according to an embodiment of the present invention, a control processor 20, and a DCT processor 92 operates as follows.

Referring to FIG. 5, image data to be processed is stored in advance in main memory 90. This image data is subjected to a coding process by quantization processor 94 and VLC processor 96 as set forth in the following. Each of processors 92, 94 and 96 transfer one block of image data from main memory 90 by an interrupt process executed by control processor 20, whereby the data from main memory 90 is stored in each local memory. The stored one block of data is subjected to a process by each processor. The result thereof is first stored in the local memory of each processor. Then, each processor provides an interrupt request signal to control processor 20. When an interrupt is accepted, the processed data of each block is transferred to main memory 90. Subsequently, each processor transfers one block of image data to be processed into each local memory. This process is repeated until the end of the data.

The process carried out by each of processors 92, 94 and 96 is controlled according to an interrupt request signal provided to control processor 20 as set forth in the following. The operation of quantization processor 94 and VLC processor 96 is similar to that of a processor of a conventional system. More specifically, when the control proceeds to the procedure step where data is to be transferred from or to main memory 90, processors 94 and 96 apply an interrupt request signal to interrupt request signal input terminals 46 and 50, respectively, of control processor 20 via interrupt request signal output terminals 104 and 108, respectively. If this interrupt request signal is accepted by control processor 20, an interrupt request acceptance signal is returned to terminals 106 and 110 of processors 94 and 96 via interrupt request acceptance signal output terminals 48 and 52, respectively, of control processor 20. It is to be noted that only the first interrupt request signal is accepted similar to the conventional case. If more than two interrupt request signals are applied to control processor 20 at the same time, one of the interrupt requests is accepted according to a predetermined priority.

A higher priority is given to DCT processor 92 differing from quantization processor 94 and VLC processor 96. The application of an interrupt request signal to control processor 20 via interrupt request signal output terminal 98 and interrupt request signal input terminal 40 when the process of DCT processor 92 comes to a step that requires access to main memory 90 is similar to the cases of quantization processor 94 and VLC processor 96. Furthermore, data transfer with main memory 90 is carried out only when an interrupt request signal is accepted by control processor 20 and an interrupt request acceptance signal is returned via interrupt request acceptance signal output terminal 44 and interrupt request acceptance signal input terminal 102, as in quantization processor 94 and VLC processor 96.

DCT processor 92 differs from processors 94 and 96 in that an interrupt reservation signal is applied to control processor 20 via interrupt reservation signal output terminal 102 and interrupt reservation input terminal 44 prior to an output of an interrupt request signal. When control processor 20 receives this interrupt reservation signal, any interrupt request signal from quantization processor 94 and VLC processor 96 is not accepted, and control processor 20 waits until an interrupt request signal is provided from DCT processor 92. When an interrupt request signal is provided from DCT processor 92, control processor 20 accepts the interrupt request signal from DCT processor 92 and carries out an interrupt process. In this case, an interrupt request acceptance signal is not returned from control processor 20 to quantization processor 94 and VLC processor 96. Both processors 94 and 96 are put in a waiting state.

The operation of DCT processor 92 is described hereinafter with reference to FIG. 7. When data transfer with main memory 90 shown in FIG. 5 is required, processor 120 provides an interrupt request signal. If this interrupt request signal is accepted by control processor 20 (refer to FIG. 5), an interrupt request acceptance signal is applied to processor 120 via terminal 100. This interrupt request acceptance signal is also applied to interrupt reservation signal generation circuit 128.

Referring to FIG. 5 again, control processor 20 transfers one block of data to be processed by DCT processor 92 from main memory 90 via a system bus 38 to DCT processor 92.

Referring to FIG. 7, processor 120 of DCT processor 92 stores one block of image data input to interface 124 into local memory 126. Following this data transfer, control processor 20 of FIG. 5 ends an interrupt process to allow acceptance of an interrupt request signal from another processor. This operation of control processor 20 will be described in details afterwards.

In DCT processor 92, a DCT process is applied to the image data stored in local memory 126. This process can be carried out independently by DCT processor 92 and does not require communication with control processor 20 or main memory 90. Because this is a regular process carried out one one block of image data of a predetermined data amount as described above, the time required for this process can be roughly estimated. When this process is completed, data transfer with main memory 50 of FIG. 5 is required again, and an interrupt request signal is provided from DCT processor 92. This means that the time period between the time when DCT processor 92 receives an interrupt request acceptance signal and the time when the next interrupt request signal is generated can be roughly estimated. On the basis of such a fact, interrupt reservation signal generation circuit 128 serves to generate and provide to control processor 20 an interrupt reservation signal after a predetermined time from detection of an interrupt request acceptance signal and before an output of the next interrupt request signal.

Referring to FIG. 8, selector 138 selects and provides to the reset terminal of counter 142 an interrupt request acceptance signal at all times except when the program is first executed. The interrupt request acceptance signal is inverted by invert circuit 136 to be applied to the set terminal of flipflop 146. The output of flipflop 146 attains an H level (no interrupt reservation signal).

After reset, counter 142 increments the count by 1 every time each pulse of a clock signal is input. Register 140 is set in advance to a delay amount corresponding to a delay time period estimated as the time period starting from the provision of an interrupt acceptance signal until generation of an interrupt reservation signal. Match detection circuit 144 applies a match detection pulse to the reset terminal of flipflop 146 when the count value of counter 142 matches the delay amount stored in register 140. The output of flipflop 146 attains a L level, whereby interrupt reservation signal 148 of negative logic is provided. This interrupt reservation signal 148 returns to the H level after this interrupt reservation signal is accepted and an interrupt request acceptance signal is applied again to interrupt reservation signal generation circuit 128.

By the above-described interrupt reservation signal generation circuit 128, an interrupt reservation signal is applied to control processor 20 (refer to FIG. 5) prior to an interrupt request signal output from DCT processor 92.

Referring to FIG. 8, selector 138 selects a reset signal provided from processor 120 to reset counter 142 in response to a select signal from processor 120 when the program is started. This is because an interrupt request acceptance signal is not entered to interrupt reservation signal generation circuit 128 since a preceding interrupt request is not yet carried out at the start of the program. The provision of a reset signal to interrupt reservation signal generation circuit 128 causes output of an interrupt reservation signal 148. In a subsequent process cycle, an interrupt request acceptance signal with respect to a proceeding interrupt request signal triggers the counting of a delay time of an interrupt reservation signal with respect to the next interrupt signal.

Referring to FIG. 6, control processor 20 carries out a process set forth in the following. First, suppose that an interrupt reservation signal is not entered. The signal provided from interrupt reservation signal input terminal 44 attains the H level. If sequence control circuit 30 allows an interrupt, flipflops 54, 60 and 66 are all reset. The level of signals provided from flipflops 54, 60 and 66 in respective OR circuits 56, 62 and 68 attain the L level. When an interrupt request signal is not entered, the signal applied to the other inputs of OR circuits 56, 62 and 68 attain the H level. All the OR circuits 56, 62 and 68 provide signals of H level to sequence control circuit 30. Therefore, sequence control circuit 30 does not initiate any interrupt process.

An interrupt request signal will not be provided from DCT processor 92 unless an interrupt reservation signal 44 is entered. Therefore, it is supposed in the following that quantization processor 94 of FIG. 5 provides an interrupt request signal in the following.

Referring to FIG. 6, the signal applied to one input of OR circuit 62 from interrupt request signal input terminal 46 attains the L level. The output of OR circuit 62 also attains the L level. An interrupt request generation signal is provided from second interrupt request generation signal output circuit 34 to sequence control circuit 30. Sequence control circuit 30 accepts this interrupt request generation signal. More specifically, sequence control circuit 30 first provides an interrupt request acceptance signal to quantization processor 94 via interrupt request acceptance signal output terminal 48. Sequence control circuit 30 also provides an interrupt request input acceptance signal 70 to first, second and third interrupt request generation signal output circuits 32, 34 and 36. Simultaneously, sequence control circuit 30 initiates transfer of one block of data from main memory 90 of FIG. 5 to quantization processor 94 via bus 28, interface 26, and system bus 38. In quantization processor 94, a process of storing the transferred data into its own local memory is carried out.

When an interrupt request input acceptance signal 70 is provided from sequence control circuit 30, flipflop 54 is set, and one input of OR circuit 56 attains the H level. Therefore, an interrupt request generation signal is not applied to sequence control circuit 30 even if an interrupt request signal is entered from first interrupt request signal input terminal 40.

In second interrupt request generation signal output circuit 34, the output of NAND circuit 58 rises to the H level, whereby flipflop 60 is set. Because one input of OR circuit 62 is fixed at the H level, an interrupt request generation signal is not applied to sequence control circuit 30 even if an interrupt request signal is entered from second interrupt request signal input terminal 46. It is the same with third interrupt request generation signal output circuit 36. That is to say, flipflop 66 is set, and the output of OR circuit 68 remains at the H level. Even if an interrupt request signal is entered from third interrupt request signal input terminal 50, an interrupt request generation signal is not applied to sequence control circuit 30.

Once any one of interrupt request signals is accepted, any interrupt request signal applied to any interrupt request signal input terminal will not be accepted. Because an interrupt request acceptance signal is not provided even if an interrupt request signal is entered, the processor providing the interrupt request signal is put into waiting.

When a predetermined interrupt process is completed by sequence control circuit 30, sequence control circuit 30 provides an interrupt process end signal 72. Interrupt process end signal 72 is a pulse of negative logic. This pulse causes all flipflops 54, 60 and 66 to be reset. The signals applied from flipflops 54, 60 and 66 to OR circuits 56, 62, and 68, respectively, attain the L level. Therefore, when an interrupt request signal is entered to any of interrupt request signal input terminals 40, 46 and 50, an interrupt request generation signal is provided from a corresponding OR circuit to sequence control circuit 30. This means that an interrupt request signal becomes acceptable when an interrupt process of sequence control circuit 30 ends.

It is assumed that an interrupt reservation signal is entered from DCT processor 92 (refer to FIG. 5) via interrupt reservation signal input terminal 44. The signal applied to NAND circuits 58 and 64 from interrupt reservation signal input terminal 44 attains the L level from the H level. Interrupt request input acceptance signal 70 attains the H level. A reservation signal rendered to the L level causes the signal entered to the set terminals of flipflops 60 and 66 to attain the H level from the L level. That is to say, flipflops 60 and 66 are set. Because OR circuits 62 and 68 have a signal of the H level applied to its one input, an interrupt request generation signal is not applied to sequence control circuit 30 even if an interrupt request signal is applied to the other input. More specifically, when an interrupt reservation signal is entered from DCT processor 92, any interrupt request signal provided from quantization processor 94 or VLC processor 96 cannot be accepted by control professor 20.

When an interrupt request signal is entered to interrupt request signal input terminal 40 from DCT processor 92, control processor 20 accepts the interrupt request signal as set forth in the following. Flipflop 54 is reset after an interrupt process end signal 72 is output independent of an interrupt reservation signal. In this case, an interrupt request signal from DCT processor 92 is applied to sequence control circuit 30 via OR circuit 56. Sequence control circuit 30 receives this signal and returns an interrupt request acceptance signal to DCT processor 92 via terminal 42, and provides an interrupt request input acceptance signal 70. As a result, flipflop 54 is set. Even if another interrupt request signal is provided from DCT processor 92, it will not be accepted. Because other flipflops 60 and 66 are already set, an interrupt request signal from quantization processor 94 or VLC processor 96 will remain unaccepted. Furthermore, because an interrupt request acceptance signal is returned to DCT processor 92 from sequence control circuit 30, the interrupt reservation signal returns to the H level as already shown with reference to FIG. 7.

When sequence control circuit 30 ends execution of a predetermined interrupt process, an interrupt process end signal 72 is provided. This signal causes all flipflops 54, 60 and 66 to be reset. As a result, any interrupt request signal from DCT processor 92, quantization processor 94 and VLC processor 96 can be accepted by control processor 20.

Figure 9:
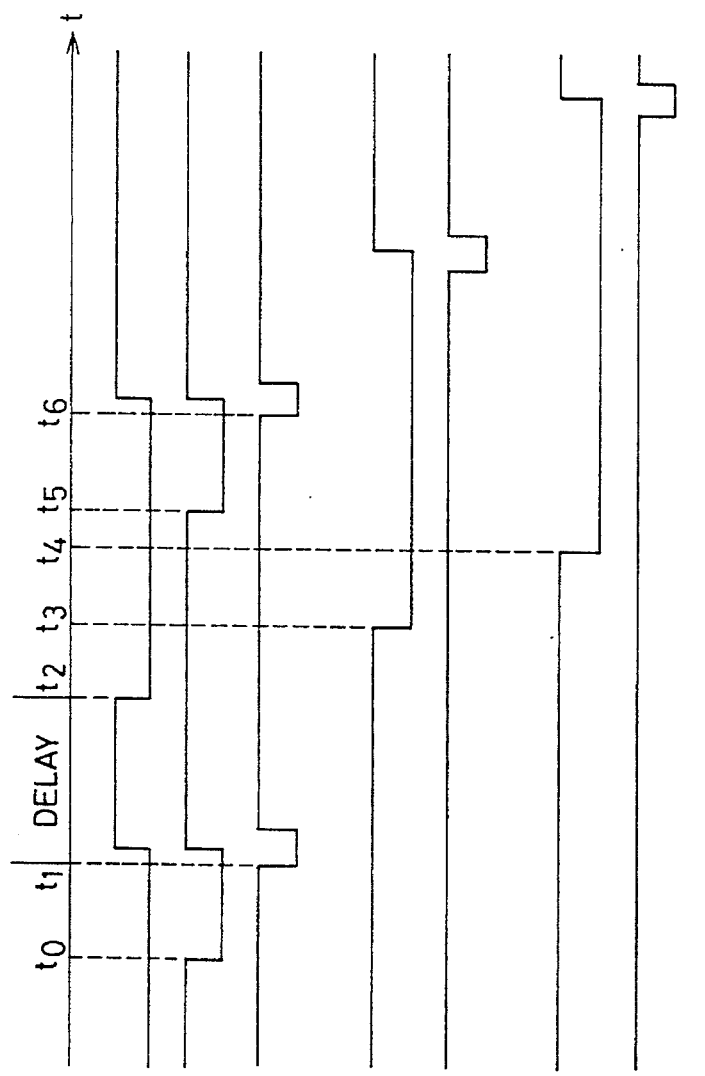
FIG. 9 is a timing chart showing the relationship of an interrupt reservation signal, an interrupt request signal, and interrupt request acceptance signal.

FIG. 9 is a time chart showing the relationship among the interrupt request signal, the interrupt reservation signal, and the interrupt request acceptance signal in the above-described operation. Referring to FIG. 9(b), a first interrupt request signal is provided from DCT processor 92 at time t0. This interrupt request signal is accepted by control processor 20. A first interrupt request acceptance signal is provided from control processor 20 at time t1. In response to this interrupt request acceptance signal, counting of a delay time of interrupt reservation signal generation circuit 128 shown in FIG. 4 is initiated. Substantially at the same time, the interrupt reservation signal-rises to the H level from the L level as shown in FIG. 9(a). Processor 120 of FIG. 7 responds to this interrupt request acceptance signal, whereby an interrupt request signal rises to the H level from the L level.

Processor 120 initiates the process of receiving data transferred from control processor 20. The transferred data is stored in local memory 126 of FIG. 7 as described above. The completion of this transfer means that the interrupt process is completed. Thereafter, DC processor 92 executes process on the data stored in local memory 126 independent of control processor 20 and other processors 94 and 96. At time t5, data transfer with main memory 90 (refer to FIG. 5) is required again after ending of the preceding process on the data. As shown in FIG. 9(b), an interrupt request signal is provided again by DCT processor 92 at time t5.

Prior to time t5, quantization processor 94 provides a second interrupt request signal at time t3. A third interrupt request signal is provided from VLC processor 96 at time t4. In this case, a conventional multiprocessor system will accept the second interrupt request signal to initiate execution of an interrupt process with respect to a request from quantization processor 94 after time t3. In contrast, the multiprocessor system according to the present invention provides an interrupt reservation signal prior to time t5 and at time t2 which is an elapse of a predetermined delay time since time t1, as shown in FIG. 9(a). Because of this interrupt reservation signal, the second and third interrupt request signals shown in (d) and (f) in FIG. 9 are not accepted by control processor 20. As a result, the first interrupt request signal is accepted by control processor 20 when the first interrupt request signal (FIG. 9(b)) is provided from DCT processor 92 at time t5. At time t6, a first interrupt request acceptance signal is returned to DCT processor 92 as shown in FIG. 9(c).

When the interrupt process carried out in response to the first interrupt request signal is completed, the acceptance of the second interrupt request signal, and then the third interrupt request signal, for example, in this case, is carried out in sequence.

Because DCT processor 92 provides an interrupt reservation signal prior to generation of a first interrupt request signal, control processor 20 will not accept any interrupt request signal from other processors generated during this time period. When an interrupt request signal is provided from the processor generating the interrupt reservation signal, the interrupt request signal of that processor is accepted at that stage. The acceptance of interrupt request signals of other processors is suppressed until control processor 20 completes an interrupt process in response to the first interrupt request signal. In other words, DCT processor 92 is given priority higher than the priorities of quantization processor 94 and VLC processor 96.

The above operation will be described with reference to FIG. 10. At time t0, the first interrupt is requested, and this request is accepted at time t1. The process of the first interrupt is executed for a predetermined time period after time t1. At time t2, an interrupt reservation signal is provided. At times t3 and t4, second and third interrupt request signals are provided, respectively. The second and third interrupt request signals are not immediately accepted due to the interrupt reservation signal.

At time t5, the first interrupt request signal is provided. As described above, the first interrupt request signal is not affected by the interrupt reservation signal, and is accepted by control processor 20. Therefore, the process of accepting the first interrupt request signal is carried out at time t6. Output of an interrupt reservation signal is suppressed due to acceptance of this interrupt request. When the process of the first interrupt is completed, acceptance of the second interrupt request is carried out to execute the second interrupt process. When the second interrupt process is completed, request of the third interrupt is accepted to initiate execution of the third interrupt process.

Figure 3:
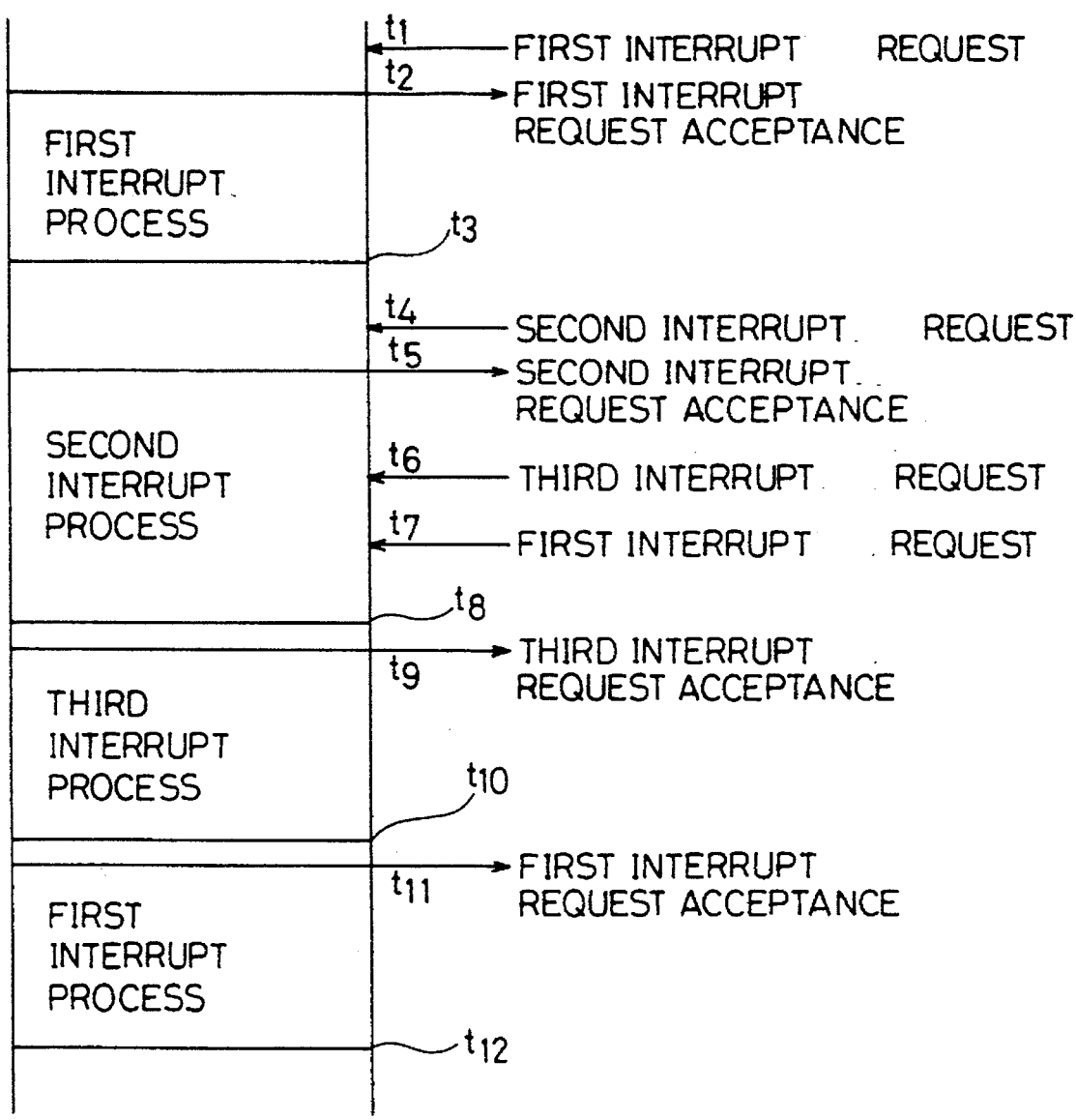
FIG. 3 schematically shows the operation of a conventional multiprocessor system.
Figure 10:
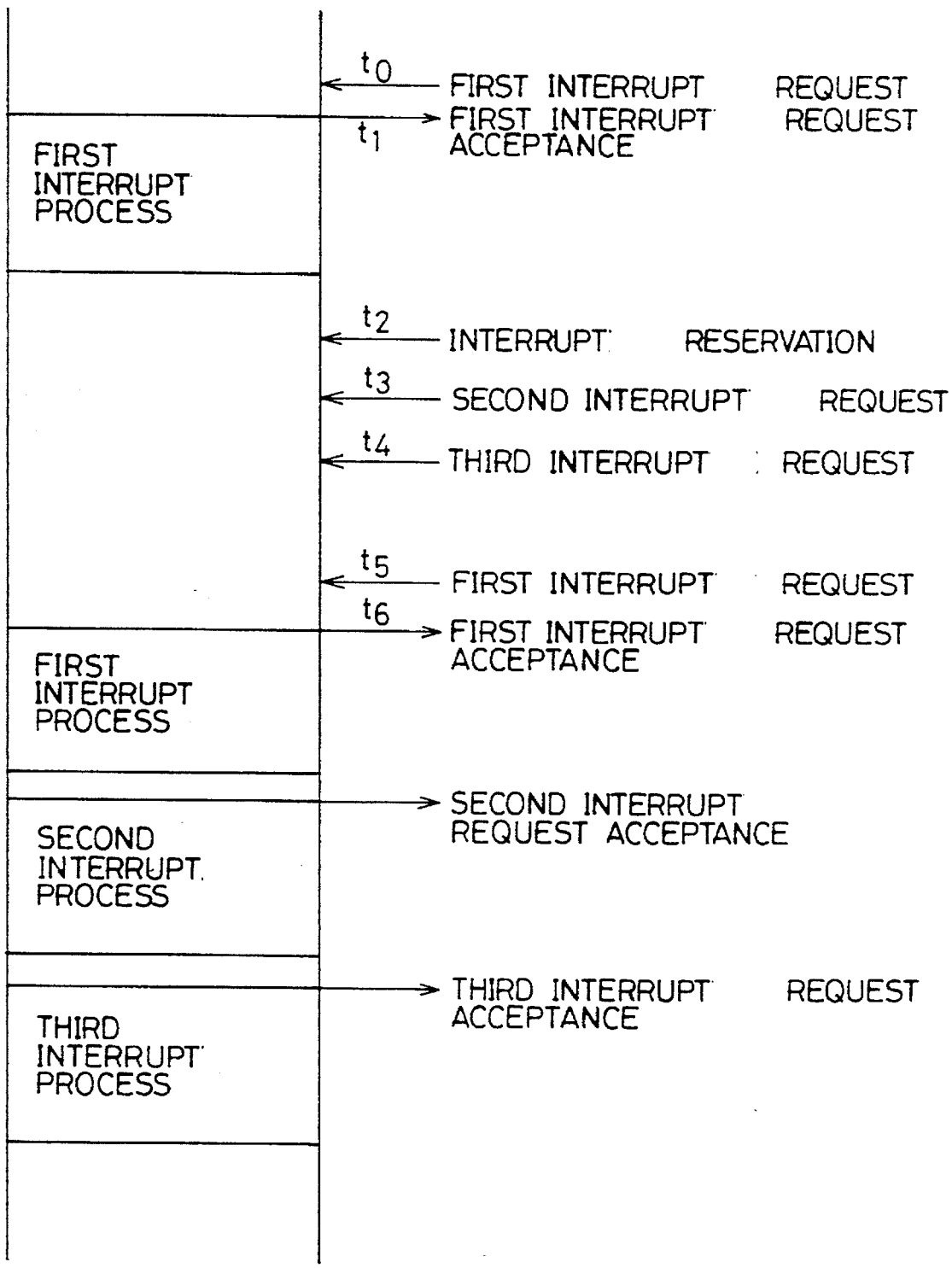
FIG. 10 schematically shows an operation of a multiprocessor system according to an embodiment of the present invention.

It can be appreciated that the first interrupt process is carried out with priority higher than the second and third interrupt processes by comparing FIG. 10 with FIG. 3 indicating operation of a conventional multiprocessor system. By treating an interrupt request from a processor that carries out a task having the greatest load in the system such as DC processor 92 as this first interrupt request, the task of the heaviest load can be executed with priority. As a result, the task efficiency of a processor having the heaviest load can be improved, whereby the entire system can be operated more efficiently.

Figure 11:
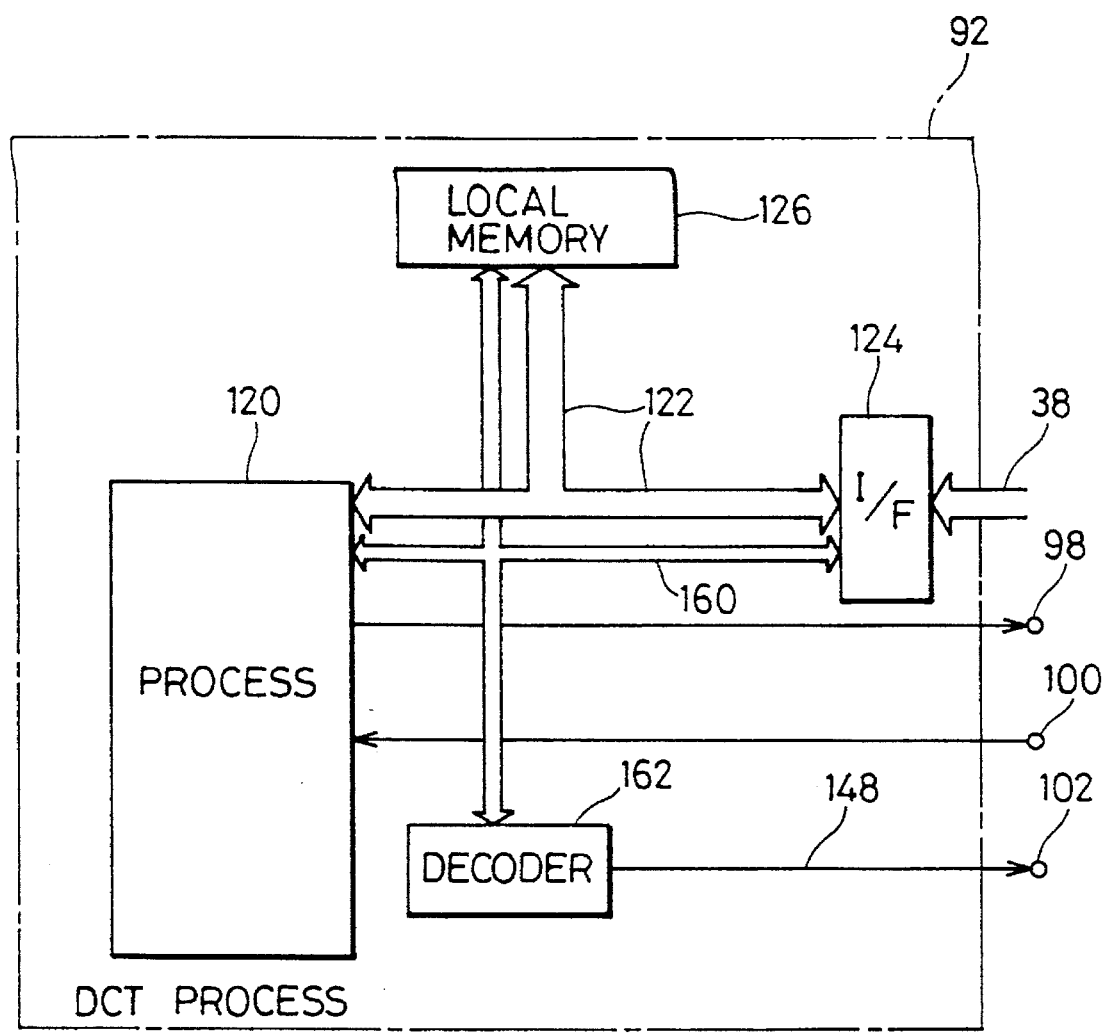
FIG. 11 is a block diagram of a DCT processor which is a processor according to another embodiment of the present invention.

FIG. 11 is a block diagram of a DCT processor 92 according to another embodiment using an instruction processing type processor. Referring to FIG. 11, a DCT processor 92 includes a local bus 122 connected to system bus 38 via interface 124, a local memory 126 and a processor 120 connected to local bus 122, an address bus 160 connected to processor 120, local memory 126, and interface 124, and a decoder 162 connected to address bus 160 for decoding an address entered from address bus 160 to detect a particular address and provide an interrupt reservation signal 148 to interrupt reservation signal output terminal 102.

In FIGS. 11 and 7, similar components have the same reference numeral and name applied thereto. Therefore, the details thereof will not be repeated here.

In DCT processor 92 of FIG. 11, an interrupt reservation signal 148 can be output at a desired time by providing a particular address data on address bus 160. An interrupt reservation signal 148 can be provided to realize such operations shown in FIGS. 9 and 10 by executing an instruction that estimates the time the next interrupt request signal is output and provides a particular address data on address bus 160 a desired time period before that estimated time during execution of the program in processor 120.

Figure 12:
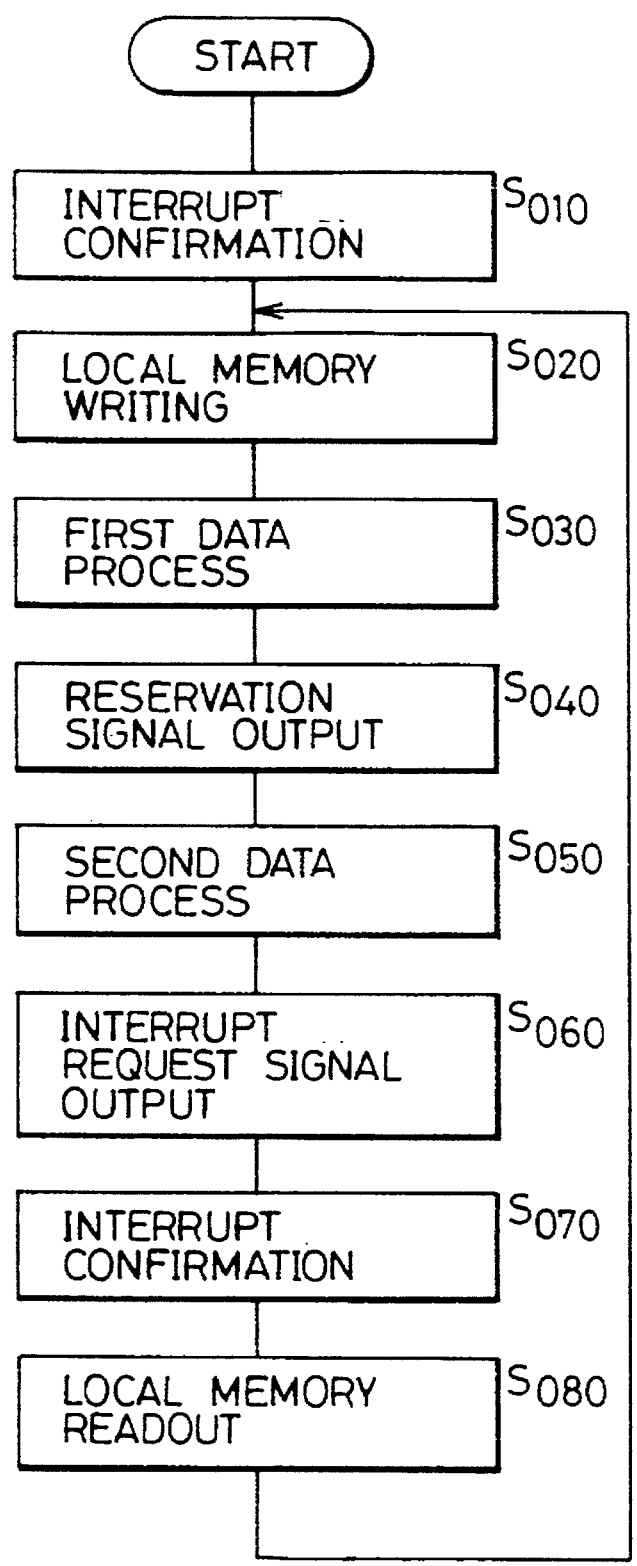
FIG. 12 is a flow chart of a program executed by the DCT processor shown in FIG. 11.

FIG. 12 is a flow chart showing an example of the control of the program executed in processor 120.

Referring to FIG. 12, an interrupt confirmation process is carried out at step S010. This interrupt confirmation process will be described in details afterwards with reference to FIG. 13. It is assumed that an interrupt request signal is always provided from DCT processor 92 at the start of the program. The control proceeds to step S020 when confirmation is made of acceptance of an interrupt request signal at step S010.

At step S020, the data transferred to interface 124 by an interrupt process executed by control processor 20 from main memory 90 (refer to FIG. 5) via system bus 28 is written into local memory 126.

At step S030, a predetermined first data process is carried out on the data written into local memory 126. This first data process may be a complete process with respect to a predetermined partial portion of the data written in local memory 126, or may be a partial process with respect to the entire data stored in local memory 126.

Following the process of step S030, an interrupt reservation signal is output at step S040. The output of this interrupt reservation signal is carried out by providing a particular address data on address bus 160 shown in FIG. 11. When this particular address data is entered, decoder 162 provides an interrupt reservation signal 148.

At step S050, execution of a second data process is carried out subsequent to the process carried out at step S030.

When all the data process is completed, a process of providing an interrupt request signal is carried out at step S060. This interrupt request is to exclusively occupy main memory 90 to transfer the processed data from local memory 126 to main memory 90 (refer to FIG. 5) and to transfer the next one block of data from main memory 90 to local memory 126.

At step S070, a process is carried out to confirm whether an interrupt request was accepted with respect to this interrupt request signal, similar to step S010. This process will be described in details afterwards with reference to FIG. 13.

When acceptance of the interrupt is confirmed at step S070, the control proceeds to step S080 where the processed data stored in local memory 126 is read out and transferred to main memory 90 (refer to FIG. 5) from interface 124 via system bus 38. Writing data into main memory 90 is executed by the interrupt process carried out at control processor 20 (refer to FIG. 5).

On completion of the process at step S080, the control proceeds to step S020 where the next data is transferred from main memory 90 (refer to FIG. 5) to local memory 126.

The process of steps S020–S080 is repeated.

Figure 13:
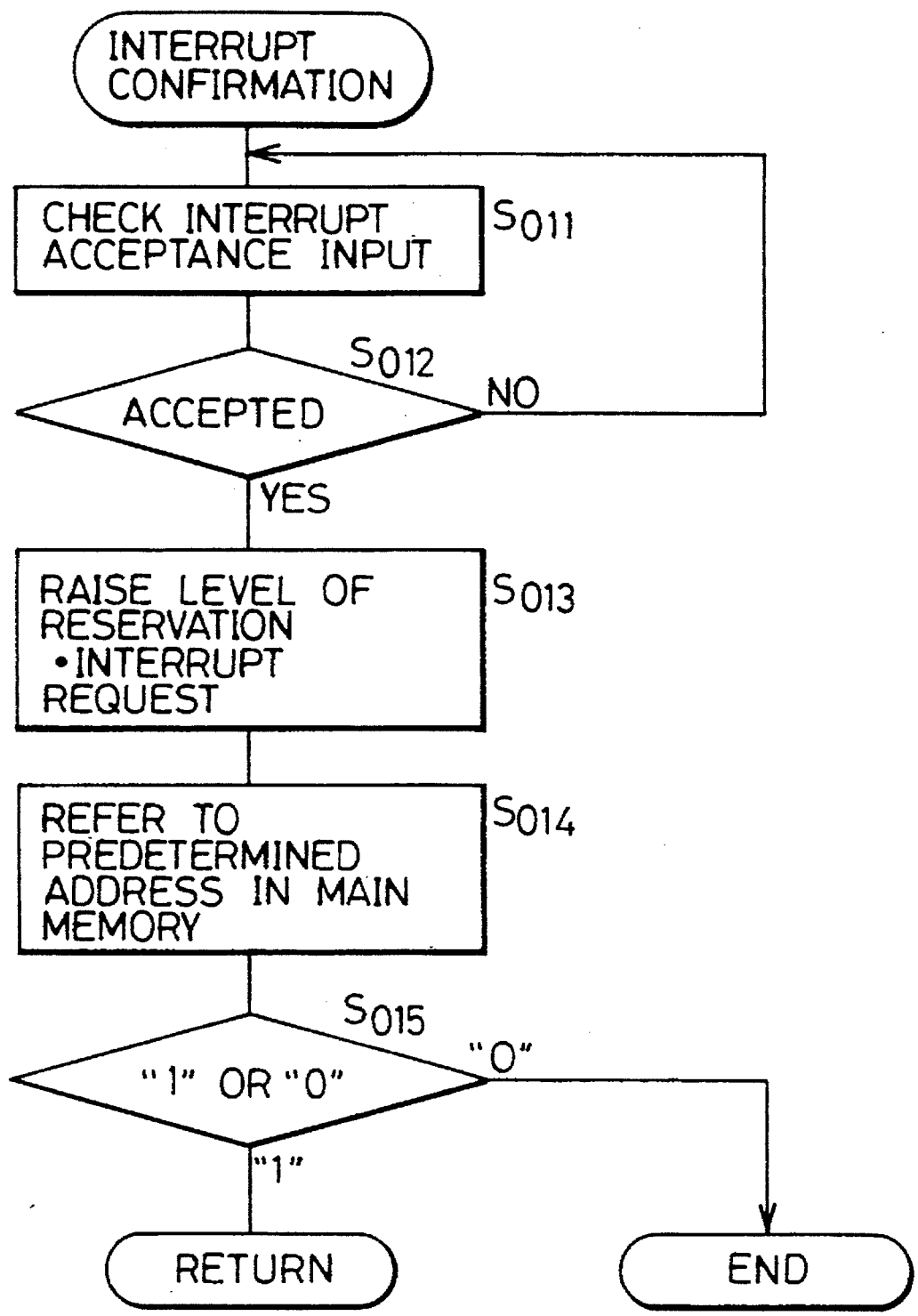
FIG. 13 is a detailed flow chart of a portion of the flow chart of FIG. 12.

FIG. 13 is a flow chart showing in details the interrupt confirmation process carried out at steps S010 and S070 of FIG. 12. Referring to FIG. 13, at step S011, the input in interrupt acceptance signal input terminal 100 shown in FIG. 11 is checked.

At step S012, determination is made whether the value of this interrupt acceptance signal attains the L level, i.e. whether the interrupt request is accepted or not. If YES, the control proceeds to S013, and otherwise to step S011. Thus, the process of steps S011 and S012 is repeated, so that the progress of the program is suppressed until an interrupt request is accepted.

At step S013, a process of raising the levels of the interrupt reservation signal and the interrupt request signal both to the H level (suppress output) is carried out. This process corresponds to the operation right after time t1 in FIG. 9.

At step S014, a process of referring to the value of a predetermined address is carried out in main memory 90 (refer to FIG. 5). This address indicates an area reserved in advance to exchange information required for system control between control processor 20 and each processor.

At step S015, determination is made whether the value stored in the address referred to at step S014 is "1" or "0". If the value is "1", this routine ends, and the control returns to the routine shown in FIG. 12. If "0", determination is made that the process is to be ended, and execution of this program is terminated. It is assumed that the data is written into a corresponding address of main memory 90 when the data process ends by control processor 20.

By executing a program of the above-described structure, an interrupt reservation signal can be output at step S040 prior to the process of step S060 shown in FIG. 12. This output timing of an interrupt reservation signal is determined by the local memory writing process carried out at step S020 and the first data process carried out at step S030. By particularly adjusting the amount of data to be processed in the first data process carried out at step S030, the output timing of an interrupt reservation signal can be adjusted. If the data process carried out at steps S030 and S050 is a routine process as described above, the time required for each data process can be estimated to a substantially accurate level. The difference of timing for an interrupt request signal output and an interrupt reservation signal output is set to an optimum value that most improves the efficiency of the entire system depending upon the load of process carried out in each processor. By assigning a higher priority level to the processor of the heaviest load, the processing efficiency of the entire multiprocessor system can be improved in comparison with the case where priority is not assigned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system comprising:

a plurality of information processors (92, 94, 96), each capable of executing an individual process;

interrupt control means (20) responsive to an interrupt request signal provided from said plurality of information processors for controlling execution means (30) without a multiple interrupt process function, including a plurality of interrupt request generation signal input terminals (41, 47, 51) to which an interrupt request generation signal is applied, a plurality of interrupt request acceptance signal output terminals (43, 49, 53) provided corresponding to said plurality of interrupt request generation signal input terminals, an interrupt request input acceptance signal output terminal (70), and an interrupt process end signal output terminal (72), responsive to a first interrupt request generation signal applied to at least one of said plurality of interrupt request generation signal input terminals for providing an interrupt acceptance signal to a corresponding said interrupt request acceptance signal output terminal and an interrupt request input acceptance signal to said interrupt request input acceptance signal output terminal (70) and initiating execution of a predetermined interrupt process, and for providing an interrupt process end signal to said interrupt process end signal output terminal (72) when said predetermined interrupt is completed;

interrupt acceptance means (32, 34, 36) including a plurality of interrupt request signal input terminals (40, 44, 46, 50) receiving externally applied interrupt request signals corresponding to a different one of said plurality of interrupt request generation signal input terminals (41, 47, 51), said plurality of interrupt request signal input terminals including first interrupt request signal input terminals (40, 46, 50) and an interrupt reservation signal input terminal (44) for receiving an externally applied interrupt reservation signal, said interrupt acceptance means being responsive to an interrupt request signal applied to said interrupt request signal input terminals (40, 44, 46, 50) for making a determination whether an interrupt is permitted or not according to a condition determined on the basis of said interrupt request input acceptance signal, said interrupt process end signal, and said interrupt reservation signal, and if an interrupt is permitted, outputting and providing an interrupt request generation signal to a corresponding interrupt request generation signal input terminal (41, 47, 51) of said interrupt process execution means;

wherein each of said plurality of information processors comprises interrupt request signal output means (98) for generating and applying to a corresponding one of said plurality of interrupt request signal input terminals of said interrupt control means an interrupt request signal when an interrupt is desired, and processing means (120) connected to a corresponding said interrupt request acceptance signal output terminal (100) for executing a predetermined process in response to an interrupt request acceptance signal provided from said interrupt control means and the information processor connected to said first interrupt request signal input terminal further comprises interrupt reservation signal output means (128, 148) for outputting and applying to said interrupt reservation signal input terminal of said interrupt acceptance means an interrupt reservation signal prior to an output of said interrupt request signal from said interrupt request signal output means.

2. The information processing system according to claim 1, wherein said plurality of interrupt request signal input terminals comprise a single said first interrupt request signal input terminal, and a second interrupt request signal input terminal, said interrupt acceptance means comprises first interrupt request generation signal output means provided corresponding to said first interrupt request signal input terminal (40), and responsive to an interrupt request signal applied to said first interrupt request signal input terminal (40) for making a determination whether said interrupt process execution means can accept an interrupt or not according to said interrupt request input acceptance signal and said interrupt process end signal, and if acceptable, outputting and applying to a corresponding interrupt request generation signal input terminal (41) of said interrupt process execution means an interrupt request generation signal and second interrupt request generation signal output means (34) provided corresponding to said second interrupt request signal input terminal (46), and responsive to an interrupt request signal applied to said second interrupt request signal input terminal for making a determination whether an interrupt is permitted or not according to said interrupt request input acceptance signal, said interrupt process end signal, and said interrupt reservation signal, and if permitted, outputting and applying to a corresponding interrupt request generation signal output terminal (47) of said interrupt process execution means an interrupt request generation signal.

3. The information processing system according to claim 2, wherein said first and second interrupt request generation signal output means comprises holding means (54, 60, 66) responsive to said interrupt request input acceptance signal and said interrupt process end signal for holding and providing information indicating whether said interrupt process execution means is during execution of an interrupt process, and logic circuit means (56, 62, 68) to carry out a predetermined logic calculation on an interrupt request signal applied via corresponding said interrupt request signal input terminal and an output of said holding means for providing the calculation result as said interrupt request generation signal.

4. The information processing system according to claim 3, wherein said interrupt request input acceptance signal, said interrupt request signal, and said interrupt request generation signal are all of negative logics, wherein said holding means of said first interrupt request generation signal output means comprises means for inverting the level of said interrupt request input acceptance signal, and a first set-reset type flipflop having the set input and the reset input connected to an output of said inverting means and said interrupt process end signal output terminal of said interrupt process execution means, respectively, and said logic circuit means of said first interrupt request generation signal output means comprises a first logic sum gate circuit having one input connected to the output of said first set-reset type flipflop and the other input connected to said first interrupt request signal input terminal, respectively.

5. The information processing system according to claim 4, wherein said interrupt reservation signal comprises a negative logic, said holding means of said second interrupt request generation signal output means comprises a NAND gate circuit having one input connected to said interrupt request input acceptance signal output terminal and the other input connected to said interrupt reservation signal input terminal, and a second set-reset type flipflop having the set input connected to an output of said NAND gate circuit and the reset input connected to said interrupt process end signal output terminal of said interrupt process execution means, said logic circuit means of said second interrupt generation signal output means comprises a second logic sum gate circuit having one input connected to an output of said second set-reset type flipflop and the other input connected to said second interrupt request signal input terminal.

6. The information processing system according to claim 3, wherein said interrupt request input acceptance signal, said interrupt request signal, said interrupt request generation signal, and said interrupt reservation signal all are of negative logics, said holding means of said second interrupt request generation signal output means comprises a NAND gate circuit having one input connected to said interrupt request input acceptance signal output terminal and the other input connected to said interrupt reservation signal input terminal, and a set-reset type flipflop having the set input connected to an output of said NAND gate circuit and the reset input connected to said interrupt process end signal output terminal of said interrupt process execution means, and said logic circuit means of said second interrupt request generation signal output means comprises a logic sum gate circuit having one input connected to an output of said set-reset type flipflop, and the other input connected to said second interrupt request signal input terminal.

7. The information processing system according to claim 1, wherein said interrupt reservation signal output means of said information processor connected to said first interrupt request signal input terminal comprises means for providing an interrupt reservation signal after an elapse of a predetermined time since an interrupt request acceptance signal is applied from said interrupt request acceptance signal output terminal corresponding to said first interrupt request signal input terminal.

8. An information processing system according to claim 7, wherein said means for providing said interrupt reservation signal after elapse of said predetermined time period operates in response to a clock signal of a predetermined frequency, and comprises storage means for storing a number defining said predetermined time period, means responsive to said clock signal for incrementing contents thereof at a constant rate, means responsive to said interrupt request acceptance signal for resetting the contents of said incrementing means, match detection means for detecting a match between the contents of said storage means and the contents of said incrementing means for generating a match detection signal, and means for initiating output of said interrupt reservation signal in response to said match detection signal, and for suppressing output of said interrupt reservation signal in response to said interrupt request acceptance signal.

9. The information processing system according to claim 8, wherein said means for resetting comprises means for resetting the contents of said incrementing means selectively responding to either of said interrupt request acceptance signal and a reset signal applied from said processing means dependent on a select signal provided from said processing means.

10. The information processing system according to claim 8, wherein said interrupt request signal and said interrupt request acceptance signal are both of a negative logic, and said means for initiating and suppressing output of said interrupt reservation signal comprises inverting means for inverting the level of said interrupt request acceptance signal, and a set-reset type flipflop including a set input connected to the output of said inverting means and a reset input connected to the output of said match detection means.

11. The information processing system according to claim 1, wherein said processing means of said information processor connected to said first interrupt request signal input terminal comprises means for providing a predetermined first address signal in response to an interrupt request acceptance signal applied from said interrupt request acceptance signal output terminal corresponding to said first interrupt request signal input terminal, and means for providing a predetermined second address signal after elapse of a predetermined time period since an interrupt request acceptance signal is provided from said interrupt request acceptance signal output terminal corresponding to said first interrupt request signal input terminal, and wherein said interrupt reservation signal output means of said information processor connected to said first interrupt request signal input terminal comprises decode means for decoding an address signal applied from said processing means to initiate output of said interrupt reservation signal in response to said second address signal and to suppress output of said interrupt reservation signal in response to said first address signal.

12. The information processing system according to claim 1, wherein said interrupt control means and said plurality of information processors are formed on a single common substrate.

13. In an information processing system comprising interrupt control means (30) having a plurality of interrupt request signal input terminals (40, 44, 46, 50) including first interrupt request signal input terminals (40, 46, 500) each for receiving an externally applied interrupt request signal, and an interrupt reservation signal input terminal (44) for receiving an externally applied interrupt reservation signal, and a plurality of interrupt request acceptance signal output terminals (42, 48, 52) provided corresponding to a plurality of interrupt request signal input terminals, and responding to the first interrupt request signal applied to said plurality of interrupt request signal input terminals when an interrupt reservation signal is not applied to accept an interrupt, and responding to only an interrupt request generation signal applied to said first interrupt request signal input terminal to accept an interrupt when an interrupt reservation signal is applied, for providing an interrupt acceptance signal to a corresponding said interrupt request acceptance signal output terminal to initiate execution of a predetermined interrupt process, and to end said predetermined interrupt process by providing an interrupt process end signal to said interrupt process end signal output terminal (72);

an information processor connected to said first interrupt request signal input terminal and said interrupt reservation signal input terminal, comprising:

interrupt request signal output means (98) for generating and applying to said first interrupt request signal input terminal of said interrupt control means an interrupt request signal when a predetermined condition is met, processing means (120) connected to one of said interrupt request acceptance signal output terminals (100) corresponding to said first interrupt request signal input terminal, and responsive to an interrupt request acceptance signal provided from said interrupt control means for executing a predetermined process, and interrupt reservation signal output means (128, 148) for outputting and applying to said interrupt reservation signal input terminal of said interrupt control means an interrupt reservation signal prior to an output of said interrupt request signal from said interrupt request signal output means.

14. The information processor according to claim 13, wherein said interrupt reservation signal output means comprises means for providing said interrupt reservation signal after elapse of a predetermined time period since said interrupt request acceptance signal is applied.

15. The information processor according to claim 13, wherein said means for providing said interrupt reservation signal after elapse of said predetermined time period operates in response to a clock signal of a predetermined frequency, and comprises storage means for storing a number defining said predetermined time period, means for incrementing contents thereof at a constant rate in response to said clock signal, means responsive to said interrupt request acceptance signal for resetting the contents of said increment means, match detection means for detecting match between contents of said storage means and contents of said increment means for generating a match detection signal, and means for initiating output of said interrupt reservation signal in response to said match detection signal, and for suppressing output of said interrupt reservation signal in response to said interrupt request acceptance signal.

16. The information processor according to claim 15, wherein said means for resetting comprises means for resetting the contents of said increment means in selective response to either of said interrupt request acceptance signal and a reset signal applied from said processing means dependent on a select signal applied from said processing means.

17. The information processor according to claim 15, wherein said interrupt request signal and said interrupt request acceptance signal are both of a negative logic, wherein said means for initiating and suppressing an output of said interrupt reservation signal comprises invert means for inverting the level of said interrupt request acceptance signal, a set-reset type flipflop having a set input connected to the output of said invert means and a reset input connected to the output of said match detection means.

18. The information processor according to claim 13, wherein said processing means comprises means for providing a predetermined first address signal in response to an interrupt request acceptance signal applied from said interrupt request acceptance signal output terminal, and means for providing a predetermined second address signal after elapse of a predetermined time period since an interrupt request acceptance signal is applied from said interrupt request acceptance signal output terminal, and said interrupt reservation signal output means comprises decode means for decoding an address signal applied from said processing means to initiate output of said interrupt reservation signal in response to said second address signal and to suppress output of said interrupt reservation signal in response to said first address signal.

19. In an information processing system including a plurality of information processors, each capable of executing individual processes; an interrupt controller responsive to an interrupt request signal provided from said plurality of information processors for controlling execution of a process carried out by said plurality of information processors, said interrupt controller comprising interrupt process execution means (30) without a multiple interrupt processing function including a plurality of interrupt request generation signal input terminals (41, 47, 51) to which an interrupt request generation signal is applied, a plurality of interrupt request acceptance signal output terminals (43, 49, 53) provided corresponding to said plurality of interrupt request generation signal input terminals, an interrupt request input acceptance signal output terminal (70), and an interrupt process end signal output terminal (72), and responsive to the first interrupt request generation signal applied to said plurality of interrupt request generation signal input terminals to provide an interrupt request acceptance signal and an interrupt request input acceptance signal to a corresponding said interrupt request acceptance signal output terminal and said interrupt request input acceptance signal output terminal, respectively, for initiating execution of a predetermined interrupt process, and to end said predetermined interrupt process by providing an interrupt process end signal to said interrupt process end signal output terminal, and interrupt acceptance means (32, 34, 36) including a plurality of interrupt request signal input terminals (40, 44, 46, 50) connected to said plurality of information processors for receiving an interrupt request signal, each corresponding to a different one of said plurality of interrupt request generation signal input terminals, said plurality of interrupt request signal input terminals including first interrupt request signal input terminal (40, 46, 50) and an interrupt reservation signal input terminal (44) to be connected to one of said plurality of information processors for receiving an interrupt reservation signal, and provided in relation to said interrupt request signal input terminals, and responsive to an interrupt request signal applied to said interrupt request signal input terminals for making a determination whether an interrupt is permitted or not according to a condition determined on the basis of said interrupt request input acceptance signal, said interrupt process end signal, and said interrupt reservation signal, and if an interrupt is permitted, outputting and applying to a corresponding interrupt request generation signal input terminal (one of 41, 47, 51) of said interrupt process execution means an interrupt request generation signal.

20. The interrupt controller according to claim 19, wherein said plurality of interrupt request signal input terminals comprise a single said first interrupt request signal input terminal, and a second interrupt request signal input terminal, said interrupt acceptance means comprises a first interrupt request generation signal output means provided corresponding to said interrupt request signal input terminal, and responsive to an interrupt request signal applied to said first interrupt request signal input terminal for making determination whether said interrupt process execution means can accept an interrupt according said interrupt request input acceptance signal and said interrupt process end signal, and if acceptable, outputting and applying, to a corresponding interrupt request generation signal input terminal of said interrupt process execution means an interrupt request generation signal, and second interrupt request generation signal output means provided corresponding to said second interrupt request signal input terminal, and responsive to an interrupt request signal applied to said second interrupt request signal input terminal for making determination whether an interrupt is permitted or not according to said interrupt request input acceptance signal, said interrupt process end signal, and said interrupt reservation signal, and if permitted, outputting and applying to a corresponding interrupt request generation signal input terminal of said interrupt process execution means an interrupt request generation signal.

21. The interrupt controller according to claim 20, wherein said first and second interrupt request generation signal output means comprises holding means responsive to said interrupt request input acceptance signal and said interrupt process end signal for holding and providing information indicating whether said interrupt process execution means is during execution of an interrupt process, and logic circuit means for applying a predetermined logic calculation on an interrupt request signal applied via corresponding said interrupt request signal input terminal and an output of said holding means for providing a calculation result as said interrupt request generation signal.

22. The interrupt controller according to claim 21, wherein said interrupt request input acceptance signal, said interrupt request signal, and said interrupt request generation signal are all of a negative logic, said holding means of said first interrupt request generation signal output means comprises means for inverting the level of said interrupt request input acceptance signal, and a first set-reset type flipflop having the set input connected to an output of said invert means and the reset input connected to said interrupt process end signal output terminal of said interrupt process execution means, and said logic circuit means of said first interrupt request generation signal output means comprises a first logic sum gate circuit having one input connected to an output of said first set-reset type flipflop, and the other input connected to said first interrupt request signal input terminal.

23. The interrupt controller according to claim 22, wherein said interrupt reservation signal is of a negative logic, said holding means of said second interrupt request generation signal output means comprises a NAND gate circuit having one input connected to said interrupt request input acceptance signal output terminal and the other input to said interrupt reservation signal input terminal, and a second set-reset type flipflop having the set input connected to an output of said NAND gate circuit and the reset input connected to said interrupt process end signal output terminal of said interrupt process execution means, said logic circuit means of said second interrupt request generation signal output means comprises a second logic sum gate circuit having one input connected to an output of said second set-reset type flipflop, and the other input connected to said second interrupt request signal input terminal.

24. The interrupt controller according to claim 21, wherein said interrupt request input acceptance signal, said interrupt request signal, said interrupt request generation signal, and said interrupt reservation signal are all of a negative logic, said holding means of said second interrupt request generation signal output means comprises a NAND gate circuit having one input connected to said interrupt request input acceptance signal output terminal and the other input to said interrupt reservation signal input terminal, and a set-reset type flipflop having the set input connected to an output of said NAND gate circuit and the reset input connected to said interrupt process end signal output terminal of said interrupt process execution means, and said logic control means of said second interrupt request generation signal output means comprises a logic sum gate circuit having one input connected to an output of said reset-reset type flipflop and the other input to said second interrupt request signal input terminal.

* * * * *